United States Patent
Tauber

(10) Patent No.: US 12,367,447 B2
(45) Date of Patent: Jul. 22, 2025

(54) DETERMINING BATTERY OR SOLAR PANEL CAPACITY FOR AN ELECTRIC REFRIGERATION UNIT

(71) Applicant: SUNSWAP LTD, London (GB)

(72) Inventor: Nikolai Tauber, London (GB)

(73) Assignee: Sunswap Ltd, London (GB)

(*) Notice: Subject to any disclaimer, the term of this patent is extended or adjusted under 35 U.S.C. 154(b) by 0 days.

(21) Appl. No.: 18/580,726

(22) PCT Filed: Jun. 30, 2022

(86) PCT No.: PCT/EP2022/068156
§ 371 (c)(1),
(2) Date: Jan. 19, 2024

(87) PCT Pub. No.: WO2023/001525
PCT Pub. Date: Jan. 26, 2023

(65) Prior Publication Data
US 2025/0086570 A1    Mar. 13, 2025

(30) Foreign Application Priority Data
Jul. 21, 2021    (GB) ..................................... 2110464

(51) Int. Cl.
*G06Q 10/0832*    (2023.01)
*B60H 1/00*    (2006.01)
(Continued)

(52) U.S. Cl.
CPC ..... *G06Q 10/0832* (2013.01); *B60H 1/00014* (2013.01); *B60P 3/20* (2013.01);
(Continued)

(58) Field of Classification Search
CPC .... G06Q 10/0832; G06Q 50/40; G06Q 50/06; H02J 7/00; H02J 7/00032; H02J 7/0048;
(Continued)

(56) References Cited

U.S. PATENT DOCUMENTS 9,440,525 B1    9/2016    Baty et al.
2019/0277647 A1    9/2019    Adetola et al.

FOREIGN PATENT DOCUMENTS

EP    3536552 A1    11/2019
EP    3647087 A1    5/2020
(Continued)

OTHER PUBLICATIONS

Poks Agnes et al: "Wholistic simulation of an all-electric refrigerated delivery vehicle", 2020 SICE International Symposium on Control Systems (SICE ISCS), The Society of Instrument and Control Engineers—SICE, Mar. 3, 2020.
(Continued)

*Primary Examiner* — Robert L Deberadinis
(74) *Attorney, Agent, or Firm* — Conley Rose, P.C.

(57) ABSTRACT

A computerized method for determining battery and/or solar panel capacity for configuring an electric refrigeration unit. The electrical refrigeration unit is configured to draw power from rechargeable batteries and solar panels in cooling a mobile enclosure interior. Input data is received relating to the location in which the refrigeration unit is to be deployed, historical weather data for the location, and a desired delivery cycle for the refrigeration unit. Thermal performance of the enclosure is simulated based on its thermal properties to output energy requirements for cooling the enclosure to the set point temperature of the delivery cycle for a particular historical day. Energy requirements for delivery cycles are iteratively simulated on plural historical days and energy to be supplied by batteries to meet the energy requirements is determined. Battery and/or solar panel capacity for storing sufficient energy to meet energy requirements for each delivery cycles is calculated.

20 Claims, 14 Drawing Sheets

(51) Int. Cl.
　　　*B60P 3/20*　　　(2006.01)
　　　*F25D 11/00*　　(2006.01)
　　　*G06Q 50/06*　　(2012.01)
　　　*G06Q 50/40*　　(2024.01)
　　　*H02J 7/00*　　　(2006.01)
　　　*H02J 7/35*　　　(2006.01)

(52) U.S. Cl.
　　　CPC ........... *F25D 11/003* (2013.01); *G06Q 50/06* (2013.01); *G06Q 50/40* (2024.01); *H02J 7/00032* (2020.01); *H02J 7/0048* (2020.01); *H02J 7/35* (2013.01); *H02J 2310/40* (2020.01)

(58) Field of Classification Search
　　　CPC .... H02J 7/35; H02J 2310/40; B60H 1/00014; B60H 1/00; B60P 3/20; F25D 11/003
　　　See application file for complete search history.

(56) References Cited

FOREIGN PATENT DOCUMENTS

| GB | 2595970 A | 12/2021 |
|---|---|---|
| WO | 2018/017818 A1 | 1/2018 |
| WO | 2021/244832 A1 | 12/2021 |

OTHER PUBLICATIONS

International Search Report and Written Opinion dated Oct. 27, 2022, for Application No. PCT/EP2022/068156.
UKIPO Search Report dated Jan. 18, 2022, for Application No. GB2110464.1.

DETERMINING BATTERY OR SOLAR PANEL CAPACITY FOR AN ELECTRIC REFRIGERATION UNIT

CROSS-REFERENCE TO RELATED APPLICATIONS

This is a U.S. National Stage of International Application No. PCT/EP2022/068156, filed on Jun. 30, 2022, which claims priority to GB 2110464.1, filed on Jul. 21, 2021, both of which are incorporated herein by reference in their entireties.

BACKGROUND

The present disclosure relates to a method of determining battery capacity of one or more rechargeable batteries for an electric refrigeration unit, to a method of determining solar panel capacity for an electric refrigeration unit and to related system, methods and computer programs. The electrical refrigeration unit being of a type configured to draw power from the rechargeable batteries in cooling the interior of a mobile enclosure.

SUMMARY

Mobile refrigeration units are known in various industries. For instance, Transport Refrigeration Units (TRUs) play an important role for the food distribution industry in delivering fresh, frozen, and other perishable food from field to market, typically from food processors to wholesale distribution hubs and/or refrigerated storage, and then onto retail and food service industries. These are found used with small rigid vans right through to articulated trucks pulling a refrigerated container. Often, a TRU may be used with a tractor unit pulling a semi-trailer (known as a semi-trailer truck in the US, an articulated lorry in the UK and various other names in other countries), where the TRU is added to a specially designed and insulated trailer according to a particular customer's specifications. The TRU typically consists of four primary components for the refrigeration cycle: evaporator, compressor, condenser, and expansion valve. When the compressor is driven, these combine to chill air in one or more compartments in the interior of the trailer to cool the contents.

Currently most TRUs are diesel driven, particularly when used with trailers. These typically use a small diesel engine to mechanically drive a compressor and power fans required for air distribution within the trailer. The period that the unit can operate on a payload of fuel depends on a number of variables such as ambient conditions, trailer design, and load requirements. Such units are well established in the industry. Nonetheless, diesel-powered TRUs have a number of drawbacks including noise and exhaust emissions. Furthermore the engine must be designed to have the power capacity to meet the pull-down requirements, i.e. chilling the interior and the contents down to the desired set point temperature. Due to these drawbacks, these units are facing a number of operational restrictions, especially during deliveries in large cities. Regulations such as ULEZ (Ultra Low Emission Zones) mean fleet operators need a clean, efficient solution.

Another technology is called "direct-drive", where the diesel engine of the tractor unit is also used to power the compressor of the refrigeration unit. The tractor unit engine is typically cleaner and more efficient than the small separate diesel engines used in TRUs. A hydraulic motor or electric motor may be used to couple power from the tractor engine to the compressor.

To address the inefficiencies associated with regular diesel-driven TRUs, some hybrid designs and eTRUs have been proposed using solar power and/or batteries to supplement and/or supplant other power sources in powering the refrigeration unit. However, these have not been readily adopted due to problems in the time taken to charge and manage batteries. Large capacity, expensive batteries are needed to provide capacity for long journeys, even though such journeys may be infrequent, and fast, expensive chargers are needed to provide high availability of the fleet and minimize downtime between journeys.

More recently, the present applicants have proposed in PCT/EP2021/062825, filed 14 May 2021, entitled "Electric Mobile Refrigeration Unit", the entire contents of which are hereby incorporated by reference in their entirety, a refrigeration unit powered by rechargeable batteries, optionally supplemented by solar, to minimize or eliminate the need for diesel power from the tractor unit or separate generator to power the refrigeration system. In this reference, the battery capacity can be adapted by swapping batteries in and out of the system and battery charging controlled according to need.

However, when provisioning such a such a system, determining the number and size of the batteries and the number and size/capabilities of the solar panels to best meet demand is challenging. Generally the system should have sufficient battery capacity such that there is always sufficient energy to meet cooling demand. Ideally the system should maximize efficient use of solar power. This could be satisfied by installing very large batteries and solar panels that can cater for all eventualities, but this has costs both in monetary terms, both capital expenditure and running costs, and in materials and maximizing efficient use of resources, etc. It is therefore desirable to use a more sophisticated approach. However, this is complicated due to the number of interrelated factors that enter into the calculation, such as the variable weather conditions affecting solar production, the thermal dynamics of the trailer, and the efficiency of the refrigeration system; the expected parameters of a duty cycle (also known as a delivery cycle), e.g. start time and length of trip, required set point temperature, and number of "door open events", i.e. where the doors are open during a trip for loading/unloading. There are further interplays between size of batteries and size of solar panels needed to maximize the use of solar energy, i.e. being able to store excess solar energy where more is generated than is needed to power the refrigeration system.

The present disclosure aims to address these and other problems in the prior art.

According to a first aspect of the present disclosure, there is provided a computerized method for determining battery capacity of one or more rechargeable batteries for an electric refrigeration unit, the electrical refrigeration unit being of a type configured to draw power from the rechargeable batteries in cooling the interior of a mobile enclosure, the method comprising: receiving input data relating to the location in which the refrigeration unit is to be deployed; retrieving historical weather data from a database for that location including at least ambient air temperature; receiving input data indicating a desired delivery cycle for the refrigeration unit, including at least information about the times of the delivery, and a desired set point temperature to be attained in the enclosure during the delivery; receiving input data identifying thermal properties of the enclosure; simulating in a model the thermal performance of the enclosure and refrigeration unit based on the thermal properties wherein the model outputs the energy requirements for cooling the enclosure to the set point temperature of the delivery cycle for a particular historical day using the historical weather data for that day and the times of delivery; iteratively simulating the energy requirements for delivery cycles on plural historical days; determining an amount of energy that must be supplied from the batteries to meet the energy requirements; determining a battery capacity for storing sufficient energy to meet the energy requirements for each delivery cycles.

Thus, by simulating the thermal performance of the enclosure and refrigeration system over multiple delivery iterations spanning historical days on which historical weather data is available, the modelling can determine the required battery capacity, e.g. 1, or 2, or 3, etc., batteries of a particular size, with a high degree of statistical confidence that the batteries will deal with future operating conditions when the refrigeration system, so provisioned, is put into service. The delivery times for the delivery cycle are correlated with the weather data such that the effect of the prevailing ambient temperature on the thermal performance of the enclosure and refrigeration system are modelled throughout the course of the delivery cycle. Similarly, if solar panels are available, the weather data is used to model solar energy production throughout the historical day, so that the effect of solar energy production can be offset against the required battery energy. Typically, inputs to the model identify a location for the delivery cycle, such that historical weather data can be retrieved from a database for the relevant location. Thus, an electric refrigeration system, e.g. a TRU for a semi-trailer or other vehicle, etc., can be provisioned with the minimum number of batteries, thus saving resources, weight, cost, etc.

This has wider benefits addressing the problem of enabling the shift away from solely diesel powered TRUs whilst maintaining operational benefits. Whilst some TRUs are known in the prior art, as referenced above, that incorporate a battery to in part power the TRU, this is typically as a back up to a diesel generator and so ultimately relies predominantly on diesel. Even if the battery in such prior art units was scaled up to a large, fixed battery, this would give rise to a range of secondary issues, including:

Higher Total Cost of Ownership (TCO) than diesel
Redundant weight and therefore unnecessary fuel consumption for the tractor unit.
Redundant battery capacity and therefore unnecessary high capital expenditure
Long battery charge times
High grid reliance
Inability to be redeployed on different delivery cycles (because the capacity is fixed)

The batteries provided to power the refrigeration system may be fixed and/or swappable. The fixed batteries may be incorporated in the main TRU unit, whereas the swappable batteries may be received in a skid mounted on the trailer or rigid sided vehicle. Any combination of these batteries may be used to capture surplus solar energy (if solar panels are present) and provide power to at least the compressor and optionally other subsystems. The battery capacity is chosen according to the requirements for a particular delivery (or duty) cycle. A delivery cycle describes the daily pattern of use of the refrigeration system according to the particular itinerary and application assigned to it as it makes journeys/trips delivering refrigerated goods.

There is customer value in buying a TRU with initially small capacity and having the ability to scale in the future. For instance, a logistics company delivers milk at 5 degrees C. to a supermarket on a 4 hour round trip in Scotland. This might take 3 battery modules. At a later point, they may contract to deliver ice cream in Malaga over a 12 hour round trip. This would clearly take more energy to provide the necessary refrigeration. The company can thus purchase more storage as and when needed for the fleet. However, initial determining the optimum battery capacity for a delivery cycle is not trivial, as many parameters feed into what capacity is required. The customer is interested in minimizing the total cost of ownership, as well as minimizing the amount of redundant capacity that is carried around, which impacts weight, and hence fuel consumption, and capital expenditure, as well as minimizing the use of diesel, where cleaner electrical energy is preferred, as well as minimizing the use of grid electricity to charge the batteries, where solar is preferred as greener and lower cost.

In an embodiment the electrical refrigeration unit also draws power from one or more solar panels, the method comprising: calculating in each iteration of the simulation the amount of solar energy generated by the panels based on available solar radiation in the retrieved historical weather data; wherein determining the amount of energy that must be supplied from the batteries comprises deducting the amount of available solar from the energy requirements for cooling the enclosure. Thus, the effect of solar generation can be included in the model such that potentially fewer batteries may be needed.

In an embodiment, the method comprises: for each iteration, running the simulation for plural different configurations of the solar panels, the configurations comprising different numbers and/or generating capacities of the panels, wherein determining the battery capacity is determined for each configuration of solar panels; and determining an optimum battery capacity and configuration of solar panels by minimizing a cost function.

In situations where there is an additional degree of freedom, i.e. the solar panels in capacity and/or number, the simulation to determine battery capacity may be repeated for each configuration of solar panels. As discussed in the detailed examples, there is a complex interplay between the number of batteries and solar panels as to combinations which can be expected to meet the operating conditions with high statistical confidence, which is further complicated by the effects of weather on the system and other inputs. Multiple different combinations may be possible. The preferred method determines an optimal combination of solar panels and batteries to minimize some cost function, which for instance may include factors such as material costs, environmental impact of sourcing materials, preferential use of green energy, maintenance costs, cost of ownership, lifecycle of the batteries/solar panels, etc. which are derived by weighting the battery capacity and solar panel configuration according to predefined cost data.

In an embodiment, the maximum value of the peak amount of energy that must be supplied from the batteries during a delivery iteration across all historical weather days is used to determine the battery capacity, and the mean amount of energy that is depleted from the batteries at the end of a delivery iteration across all historical weather days is used to determine the mean amount of charging of the batteries from the grid, wherein one or any combination of the battery capacity, solar panel configuration and amount of charging are used to determine the cost function. The model calculates the battery capacity, i.e. energy store, required to meet the cooling requirements throughout the historical day. This may be based on the accumulated discrepancy between the solar electricity production and refrigeration system electricity consumption. This can be obtained by finding the time integral of the consumption minus the time integral of the solar production. The peak value of the discrepancy gives the minimum battery capacity required to store sufficient energy to meet peak demand for that delivery iteration, i.e. for the delivery cycle on that particular historical day with a particular configuration of solar panel. The maximum peak value for all historical days is input to the cost function as indicating the required battery capacity, which affects capital expenditure. The final value of the energy store gives the charging requirement, i.e. the amount of energy that must be replenished before the next delivery cycle by charging from the grid. The mean value for all historical days is input to the cost function as the charging requirement, which affects operating costs, green energy used, etc.

In an embodiment, the modelling simulates excess energy from the solar panels that is not required at a particular time to power the refrigeration system being used to charge the batteries.

In an embodiment the modelling assumes a finite size of batteries and a predetermined initial state of charge at the start of the delivery cycle, determines the running level of charge in the batteries and further determines where excess solar energy cannot be used to charge the batteries when at 100% State of Charge. In other examples, the model may assume an initial charge that is less than 100% such that there is capacity to store excess solar energy. In some embodiments, smart charging may be employed, where a prediction is made as to how much battery capacity is required for a delivery iteration given expected weather conditions, and the battery initial charge is set accordingly.

The modelling may simulate excess solar energy being exported to a tractor unit arranged to transport the mobile refrigeration unit, and the cost function includes a variable for fuel savings in the tractor unit as a result.

The modelling may simulate a deficit in battery charge level being provided by energy imported from the tractor unit.

The modelling may simulate for each iteration, running the simulation for plural different configurations of at least one property of the enclosure and refrigeration system that affects thermal performance and/or efficiency, wherein determining the battery capacity is determined for each configuration of that property; and determining an optimum battery capacity and configuration for that property by minimizing a cost function. Thus, as an alternative or additional to simulating the performance for different solar panel configurations, the modelling may allow another parameter to be varied, such as enclosure wall insulation thickness or materials, which also has an effect on the thermal performance of the system. The cost function may accordingly be adapted to include and weigh variables relating to the additional parameter, such as the cost of the insulation or environmental impact of sourcing the materials, etc. Similarly, the refrigeration cycle could be made more efficient at an added cost hence providing an additional optimization variable.

The simulation may be for historical days spanning at least a year, and preferably plural years. At least a year is preferred to take account of all seasonal weather variations. Plural years are more preferred to give take account of more extreme weather conditions that can be expected.

The model may take historic weather data at plural points in time during the delivery cycle.

The enclosure properties may include one or more of wall thicknesses, wall materials and enclosure dimensions to model the thermal performance of the enclosure.

The input data for the delivery cycle may include timings of door open events and/or payload type or types.

The modelling may simulate the net charge that must be imported and/or exported to the batteries from the grid before the delivery cycle in order to meet the energy requirements for each of the plural historical weather days, and wherein the cost function includes a variable relating to the amount of charge.

The cost function may include the capital expenditure of the batteries and solar panels and operating cost of charging the batteries from the grid and optionally maintenance costs of the system.

The modelling may comprise a model of the enclosure including thermal properties including one or more of: wall thicknesses and/or materials; number of compartments in the enclosure each of which may be allocated a different desired set point temperature; payload type or types; and door opening events.

The modelling may comprise a Resistance Capacitance (RC) thermal model of the enclosure to determine heat flows into the enclosure for a given temperature gradient between air temperature in the enclosure and ambient air temperature and the effect on the air temperature in the enclosure and/or for modelling door open events and the thermal properties include constants for the RC thermal model.

The modelling may include modelling the response of the system controller in activating the refrigeration system to supply cooling where the actual temperature deviates from the desired set point temperature.

The modelling may include modelling the energy requirements in providing that response.

In an embodiment, the simulation is a transient reduced order model resolved for multiple time-steps every iteration of the simulation.

According to a second aspect of the disclosure, there is provided a computerized method for determining solar panel capacity for an electric refrigeration unit, the electrical refrigeration unit drawing power from the solar panels and from rechargeable batteries in cooling the interior of a mobile enclosure, the method comprising: receiving input data relating to the location in which the refrigeration unit is to be deployed; retrieving historical weather data from a database for that location including at least incident solar radiation; receiving input data indicating a desired delivery cycle for the refrigeration unit, including at least information on the times of the delivery, and a desired set point temperature to be attained in the enclosure during the delivery; receiving input data identifying thermal properties of the enclosure; simulating in a model the thermal performance of the enclosure and refrigeration unit based on the thermal properties wherein the model outputs the energy requirements for cooling the enclosure to the set point temperature the delivery cycle for a particular historical weather day using the historical weather data for that day and the times of delivery; iteratively simulating the energy requirements for delivery cycles on plural historical days; determining an amount of energy that must be supplied from batteries and solar panels to meet the energy requirements; determining a solar panel capacity for generating sufficient energy to meet the energy requirements for each of the plural historical days for batteries having a particular capacity.

Thus, the simulation may be used to optimize the provisioning of a refrigeration system where the number and/or battery capacity is assumed to be fixed, and the number of solar panels varied. Alternatively or additionally other properties of the system may be varied, such as enclosure wall materials and thickness.

In another aspect, the disclosure relates to a computer program, optionally recorded on a non-transitory medium, containing machine readable instructions which when executed by the processor of a computing system cause the computer to carry out the method of any preceding claim.

In another aspect, the disclosure relates to a method of deploying one or more rechargeable batteries for an electric refrigeration unit, the electrical refrigeration unit being of a type configured to draw power from the rechargeable batteries in cooling the interior of a mobile enclosure, the method comprising determining the battery capacity according to any method described above; and fitting sufficient rechargeable batteries to the refrigeration unit to provide a minimum of the determined battery capacity.

In another aspect, the disclosure relates to a method of deploying one or more solar panels for an electric refrigeration unit, the electrical refrigeration unit being of a type configured to draw power from the rechargeable batteries and the solar panels in cooling the interior of a mobile enclosure, the method comprising determining the solar panel capacity according to any method described above; and fitting sufficient solar panels to the refrigeration unit to provide a minimum of the determined solar panel capacity.

In another aspect, the disclosure relates to a refrigeration unit deployed according to the method described above.

It will be appreciated that any features expressed herein as being provided "in one example" or "in an embodiment" or as being "preferable" may be provided in combination with any one or more other such features together with any one or more of the aspects of the present disclosure.

BRIEF DESCRIPTION OF THE DRAWINGS

Embodiments of the present disclosure will now be described by way of example with reference to the accompanying drawings, in which.

DETAILED DESCRIPTION

Figure 1:
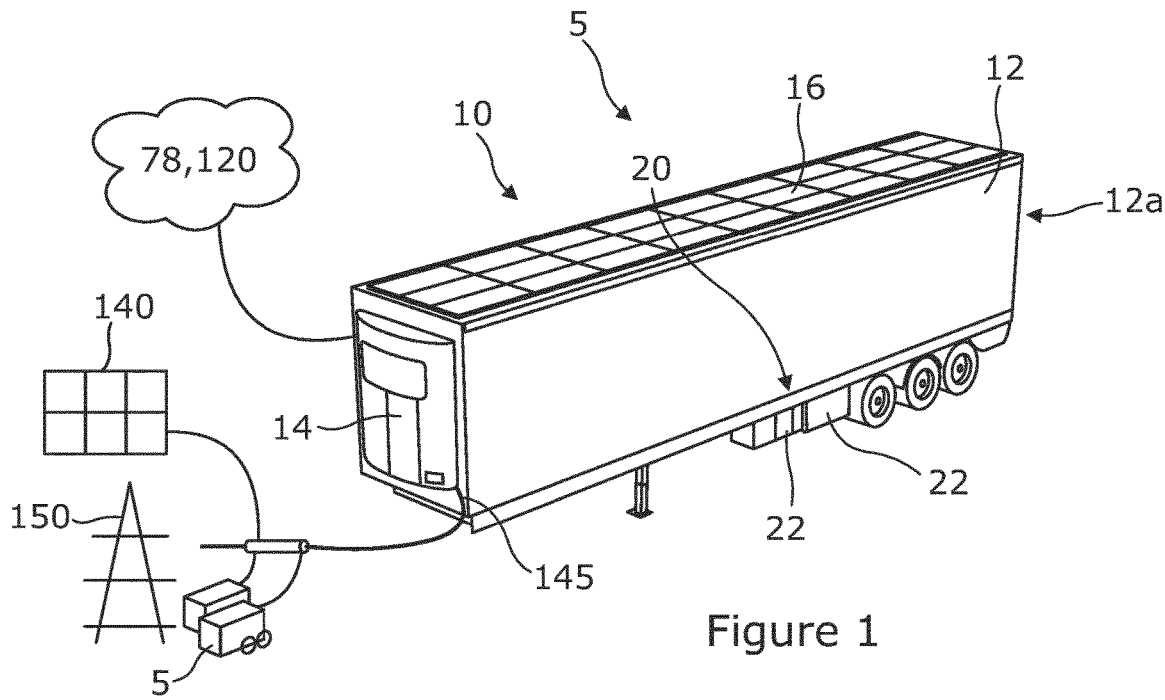
FIG. 1 shows a perspective view of an example of a refrigeration unit according to an embodiment of the present disclosure attached to a trailer.

FIG. 1 shows a perspective view of an example of a mobile refrigeration unit, more specifically in this example a Transport Refrigeration Unit (TRU) 10, attached to a semi-trailer 12 of the sort that can be attached to and pulled by a tractor unit (not shown) to transport goods loaded to the interior of the trailer, where the TRU 10 implements a system for refrigerating the interior of the trailer. It will be appreciated that the TRU may equally be attached to other vehicles types, such as rigid body trucks, vans and lorries and may be generally applicable to cooling the interior of any enclosure. As will be described further below, the TRU forms part of an overall system 5 for managing the TRU.

Figure 2:
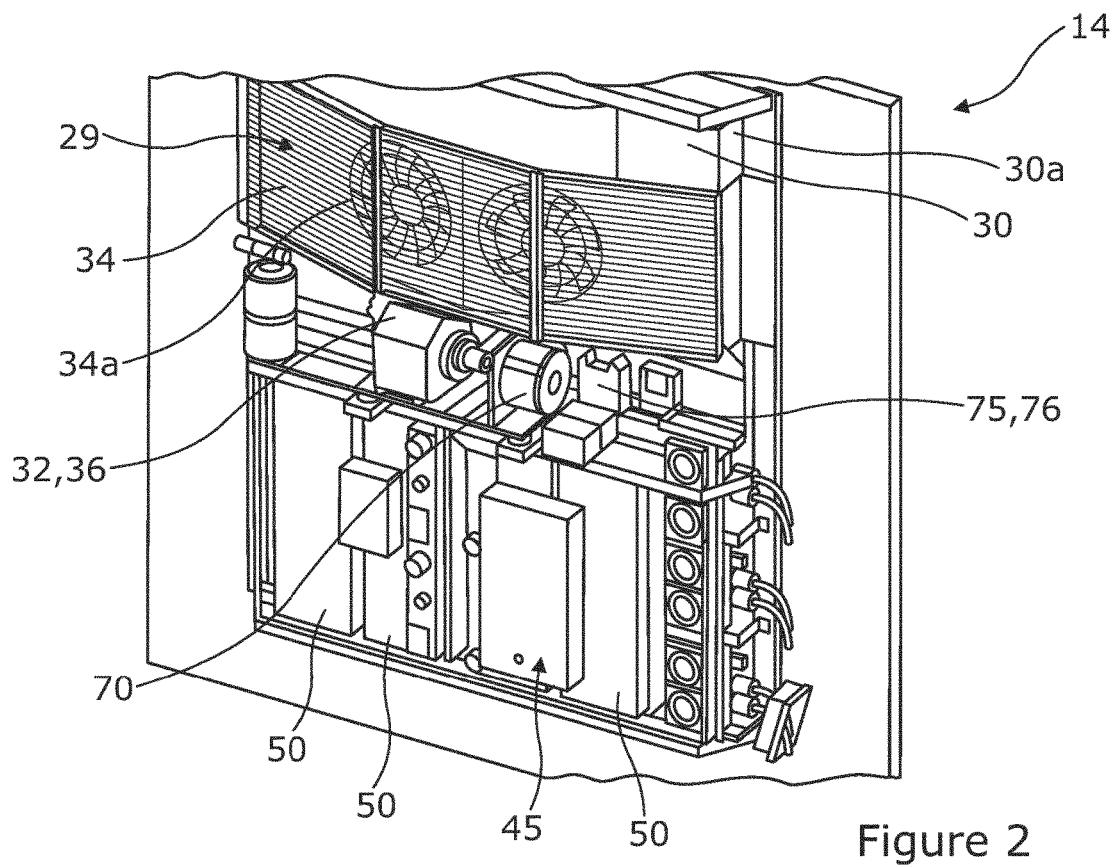
FIG. 2 shows a view of the main unit of the refrigeration unit of FIG. 1.

The TRU 10 comprises a main refrigeration unit 14, shown in more detail in FIG. 2, attached to the near end of the trailer 12 (with the doors 12a allowing access to the interior of the trailer being at the far end), as per known arrangements. The main unit 14 comprises the four primary components for the refrigeration cycle in a vapor compression refrigeration system 29: evaporator 30, compressor 32, condenser 34, and expansion valve 36. When the compressor 32 is driven, these combine to chill air in the interior of the trailer 12 to cool the contents.

The TRU 10 also comprises one or more solar panels 16 attached to the roof of the trailer 12. The solar panels 16 may be low profile, semi-flexible, 20% efficient, monocrystalline panels for instance. These are preferably mounted to the roof of the trailer, but can be mounted at any convenient point.

The TRU 10 also comprises one or more rechargeable batteries. These may be any number of fixed batteries 50 and/or removable batteries 22 (i.e. swappable batteries to allow the overall battery capacity to be more simply altered). The fixed batteries 50 and removable batteries 22, together with the solar panels 16, provide power the TRU 10. The fixed battery or batteries 50 are typically embedded in the TRU in a form in which they are not intended to be removed during operational life of the TRU once the TRU has been initially provisioned. The swappable batteries may be provided in a battery rack 20 underneath the trailer, and are intended to be swapped during the life of the TRU according to the requirements of the operator.

Various sensors monitor temperature and pressure at various points in the cycle, both of the refrigerant and ambient air and air in the trailer. Further sensors may monitor the state of the various electrical elements and other components of the system.

An electrical system 45 of power electronics is provided, the primary purpose of which is to supply electric power to drive the compressor motor and fans. Within the electrical system 45, the batteries are connected via a bus to various power controllers to manage delivery of power from the various power sources to the batteries and from the batteries and other sources to the power consuming devices. The compressor 32 in this example is powered by an AC output voltage provided by the motor controller 70 which alters the frequency of the AC power so as to vary the speed of the motor and thus the compressor under control of the system controller 75. The output voltage is also selectively supplied to the fans 30a,34a of the evaporator 30 and condenser 34.

The solar panels 16 to provide power when in transit and/or when stationary. Where solar power is available, this can be used to power the compressor motor 32,70 (in conjunction with battery power if solar is insufficient). If there is excess solar energy, the excess can be used to charge the batteries by selectively connecting the batteries to the bus 52. Otherwise, the batteries can be left disconnected.

The TRU 10 may have a grid connector 145 for connecting to the grid 150 and one or more on-board chargers (OBC) to provide power at the appropriate DC voltage level to the DC bus for powering the refrigeration system or charging the batteries when the trailer is parked. If no solar or grid power is available batteries will provide the energy. The charger is bi-directional, so as to be capable of the reverse process, i.e. converting PV or battery DC power to AC for sharing power with other TRUs via the local grid or exporting surplus power to the wider power grid.

The battery 22,50 and solar panel 16 can be used to provide supplementary power to the tractor unit itself, for example where the tractor unit runs on fuel cells or is powered by a diesel ICE, via a suitable connection from the bus to the tractor unit. Conversely, the bus may also be able to receive supplementary power, e.g. from axle regeneration, from the tractor unit or trailer via an input for use in powering the compressor.

A system controller 75 is provided with communication links to the various parts of the TRU 10 to control and monitor the refrigeration process, i.e. to pull down and maintain a set point temperature, and to manage and monitor the various energy sources. The system controller 75 is preferably connected to or incorporates a wireless gateway (e.g. 4G) 76 by which it can exchange data with software 120 running on a remote server or in the cloud 78, which is part of the overall system 5. The system controller 75 may include a Human Machine Interface, by which it can be controlled locally by an operator. The system controller 75 can also be controlled directly from the cloud by the software 120, so settings can also be adjusted remotely.

The software platform running in the cloud 78 monitors performance of the electrical system 45 and refrigeration system 29. The software platform also manages the batteries for the trailers and controls and monitors charging of the batteries in the TRU, when connected to the local grid, or in a dedicated charging station when the removable batteries are swapped out of the TRU.

As discussed above, the overall system 5 has flexibility in the number of batteries (and/or their storage capacity) and the number of solar panels (and/or their generating capacity) that can be installed in the system. The software in the cloud manages the batteries for day-to-day operation. Optionally, the software in the cloud manages the charging of the batteries to a predicted level—this is essentially "smart charging". As discussed below in relation to FIG. 14, the model can make various assumptions about the amount of solar power that is recovered, i.e. with smart charging the batteries are initially charged to a level such that all excess generated solar power can be stored by the batteries. However, as discussed above, there is a supplemental problem in optimally provisioning the system to start with in line with the intended end use of the trailer to give the best number of batteries and solar panels to keep down costs, minimize wastage in materials and use of "non renewables" energy, etc., whilst meeting peak expected demands on the system for a given delivery cycle experiencing varying weather patterns.

Figure 2A:
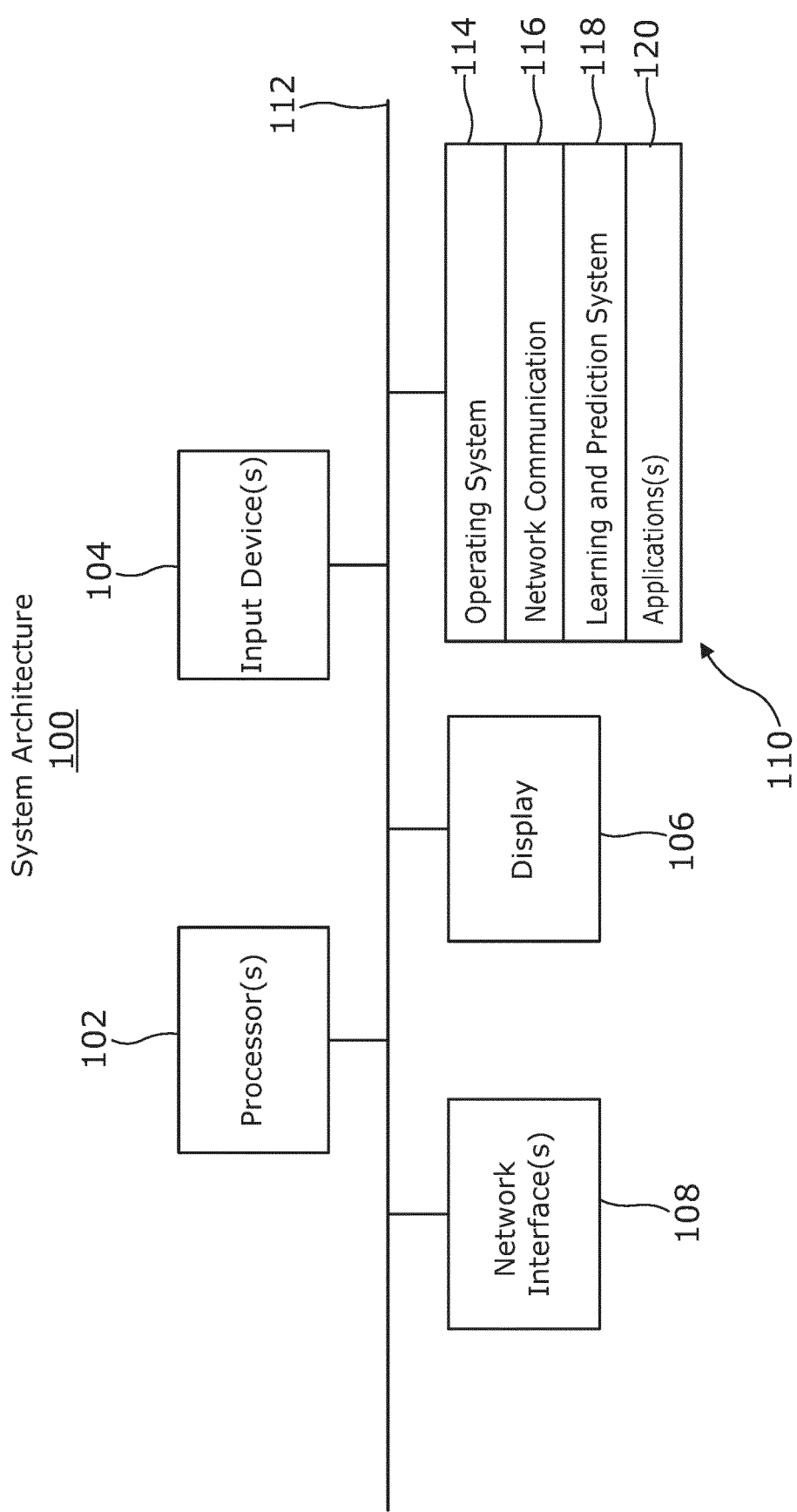
FIG. 2A shows an overall view of the system architecture 100 of an exemplary computing system in which the software application according to an embodiment of the disclosure may be implemented.
Figure 3:
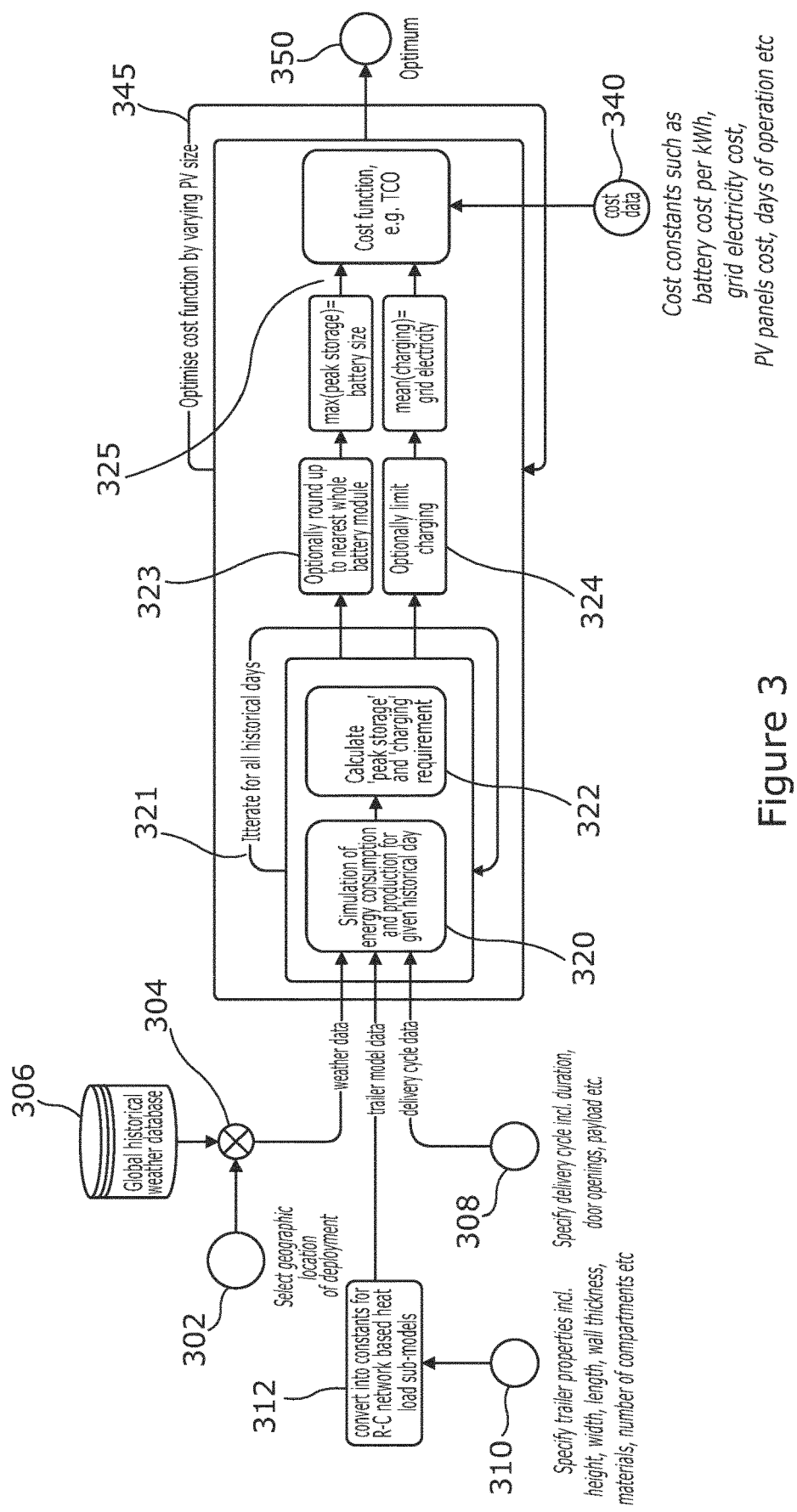
FIG. 3 shows a an exemplary flow diagram of a computerized method implemented by the software for calculating and optimizing the provisioning of storage and/or solar panels for a refrigeration system.

FIG. 3 shows a diagram illustrating an exemplary flow diagram of a computerized method for calculating and optimizing the provisioning storage and/or solar panels for a refrigeration system of the type described above. The software or computer program implementing the method may be in the form of machine readable instructions, which may be encoded on a non-transitory storage medium, which when executed by a processor of a computing system cause the processor to carry out the method. FIG. 2A shows an overall view of the system architecture 100 of an exemplary computing system in which the software application 120 may implement the features and processes described herein. The architecture 100 may be implemented on any electronic device that runs software applications derived from compiled instructions, including without limitation personal computers, servers, smart phones, cloud devices, etc. In some implementations, the architecture 100 may include one or more processors 102, one or more input devices 104, one or more display devices 106, one or more network interfaces 108, and one or more computer-readable mediums 110, which stores an operating system 114, network communication stack 116, and software applications 120. Each of these components may be coupled by a data bus 112.

The system 300 receives user input 302 indicating the geographic location of deployment, e.g. GPS degrees latitude and longitude or nearest city, or the like. Based on this, the system obtains historical weather data spanning a period of time for that location, including at least the ambient temperature and available solar radiation for PV panels. Such data may be obtained from a publicly available database 306, for instance, from the European Commission's "photovoltaic geographic information system" accessible at: https://re.jrc.ec.europa.eu/pvg_tools/en/#PVP The system 300 also receives user input 308 comprising details the duty cycle, including start time and duration of the trip, the payload (e.g. type and weight) and set point temperature required for the payload, and number and timing of door open events.

The system also receives user input 310 indicating thermal properties of the trailer. For instance, the user may select the trailer type from a predefined list of trailer types, and the system looks up data 311 for the trailer relating to tangible properties of the trailer. These might include factors such as the dimensions of the trailer, the wall materials, construction and thicknesses, the number of internal compartments, the size of the doors, leakages, etc. Further factors may include the efficiency of the refrigeration system in converting input energy to cooling effort. Alternatively, these parameters might be input by the user directly. These tangible properties of the trailer are input to a model 312 where the properties are converted into model constants for a R-C network based heat load model for the trailer, i.e. resistance and capacitances. Alternatively, the RC constants could be collected from a pre-populated database for different trailer types according to the selected trailer.

These data points are fed to a model 320 that simulates the thermal characteristics of the refrigeration system 29 and trailer 12 in terms of the energy required to achieve the desired operating conditions, i.e. internal temperature, for the selected trailer during a delivery given the desired delivery cycle parameters and background weather conditions and configuration of solar panels. An iteration 321 of the simulation is performed for the delivery cycle (referred to as a "delivery iteration" herein) for each of a plurality of different days in the historical weather dataset, spanning preferably at least a full year, or more preferably plural years, to build up an output dataset of energy required under different conditions, which gives bounds on energy usage that can be of the conditions expected to apply with sufficient statistical confidence in provisioning the system for future, real world use. In the present example, 4383 iterations of the simulation are performed, each iteration being a delivery cycle on a historical weather day with a given solar panel size covering January 2005 to December 2016.

For each delivery iteration, the peak storage requirements are calculated using the model. This is generally the amount of energy required for achieving the desired operation conditions minus the energy generated by the solar panels (if any). More specifically, it is the peak value of the accumulated discrepancy between solar PV electricity generation and refrigeration system electricity consumption. For instance: (1) a perfect match between solar PV and consumption would have no accumulated discrepancy and therefore require no battery capacity. (2) In a system without a solar array, the peak discrepancy would just be the consumption and occur at the end of the delivery cycle. (3) In between these two edge cases, the peak could happen at a point in time (depending on how much the sun shines and how much energy is consumed). Optionally, the peak capacity may be rounded up to the nearest whole number of batteries 323, e.g. where the system supports batteries of a particular predetermined size.

Also, for each delivery iteration, the charging requirement for the batteries is calculated, which is the net change in the amount of charge in the batteries over the delivery iteration which must be replenished, e.g. by charging from the grid between delivery cycles. Optionally, the charging requirement may be modified 324 in accordance with different charging strategies that may be implemented, e.g. the batteries may be replenished to 100% State of Charge each time, or smart charging may be employed so the batteries are only charged to the level they are predicted to require.

The maximum peak storage value for all the iterations in the simulation is then found, which gives the required battery capacity. The mean charging required for all the iterations in the simulation is calculated, which indicates the mean amount of grid electricity required per delivery cycle. This gives the output data set 325 for the simulation.

The output data set 325 is fed to a cost function, which applies cost data 340 to weight the variables in the output data set 325 to produce a cost for the particular configuration of battery capacity and solar panel size.

Last, the simulation is repeated 345 for different configurations of solar panels (termed a "solar panel iteration" to distinguish it from a delivery iteration). Thus, each delivery iteration is repeated for different configurations of solar panels 16, e.g. with different solar energy generation capabilities. Thus, the delivery iteration for each historical day may be performed with 0, 1, 2, or more solar panels. The resultant cost function values for each configuration of solar panels that is simulated are then minimized, which finds the optimum combination 350 of battery capacity and solar panel capacity (from those supported by the system) according to the selected cost metric.

The cost function may a Total Cost of Ownership metric, in which case the cost data may include cost constants such as battery cost per kWh which is applied to the battery size variable, solar panel cost, which is applied to the particular configuration of solar panels assumed for the simulation, and grid electricity cost which is applied to the charging requirement variable. The TCO may also include factors relating to maintenance costs, and baseline costs, to provide an real world total cost amount to the customer. The cost metric might generally relate to minimizing capital expenditure, operating costs, total cost of ownership, minimizing materials used, minimizing maintenance cost, minimizing use of mains electricity to charge batteries, maximizing green energy sold back to the grid, maximizing expected days of operations of the system, e.g. battery lifecycle, etc., or any combination thereof.

Figure 19A:
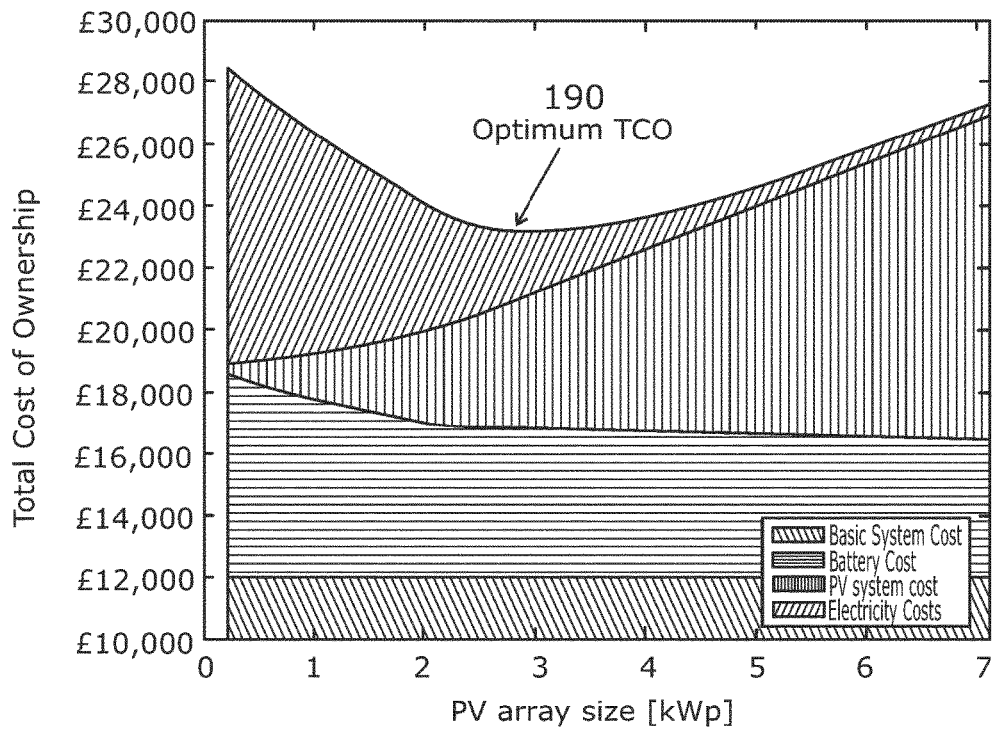
FIGS. 19A and 19B FIG. 19A show examples of an output of a total cost of ownership cost function as a function of solar array size.

FIG. 19A shows an example of the output of a total cost of ownership cost function with the individual weighted variables in the cost function shown separately and with the solar array size plotted along the x-axis. As can be seen, there is a basic system capital expenditure cost, which is invariant, solar panel capital expenditure cost, which increases with the number of solar panels, the battery expenditure cost, which falls as the number of solar panels increases, and the electricity costs required for charging the batteries, which again falls as the number of solar panels increases. It can be seen that there is a minimum in the overall cost function at a point 190 corresponding to there being approx. 3 kWp of solar panels.

Figure 19B:
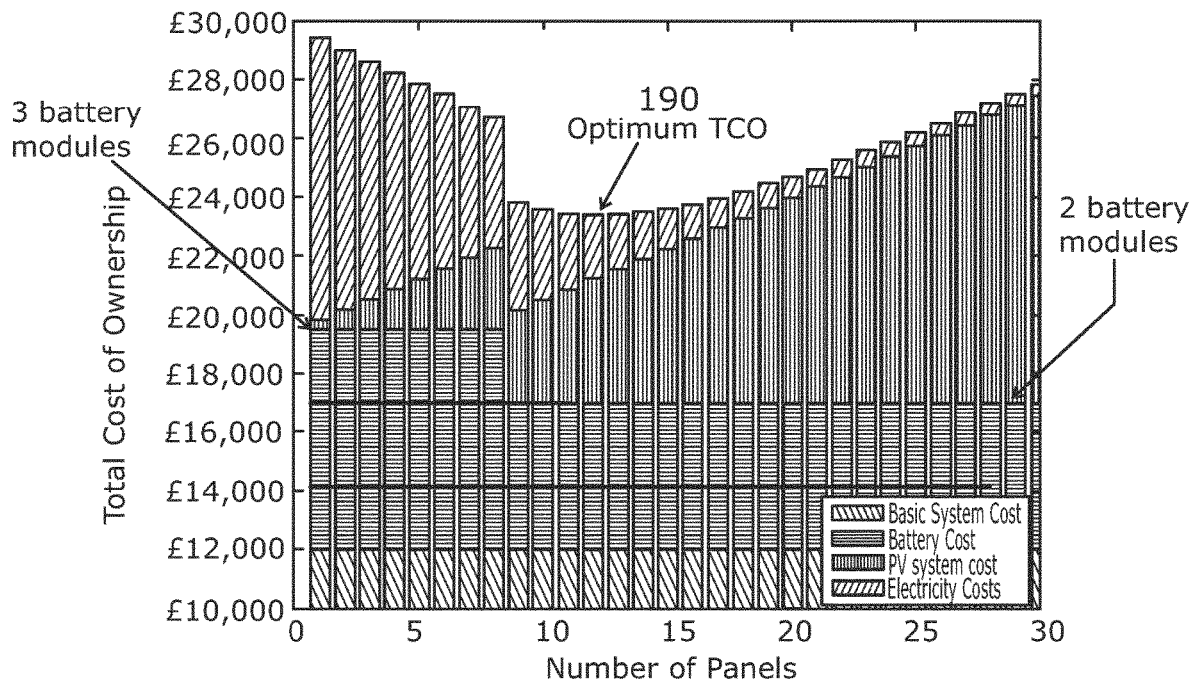

FIG. 19B shows another version of the output of a total cost of ownership cost function, with the difference from FIG. 19A that the solar array size is rounded up to a discrete number of solar panels of a given size (e.g. 360 W) and with the number of battery modules also given as a discrete number (as per the output of module 323 in FIG. 3). In this example the battery modules each have a useful capacity of 8 kWh.

In the present example a "brute force" approach is used to optimize the cost function, i.e. the entire simulation comprising each delivery iteration over all historical weather days is repeated for every combination of solar panels. However, other techniques can be used to make the process less computationally expensive, e.g. well known optimization techniques such as gradient descent, genetic algorithms, etc. may be employed.

Figure 4:
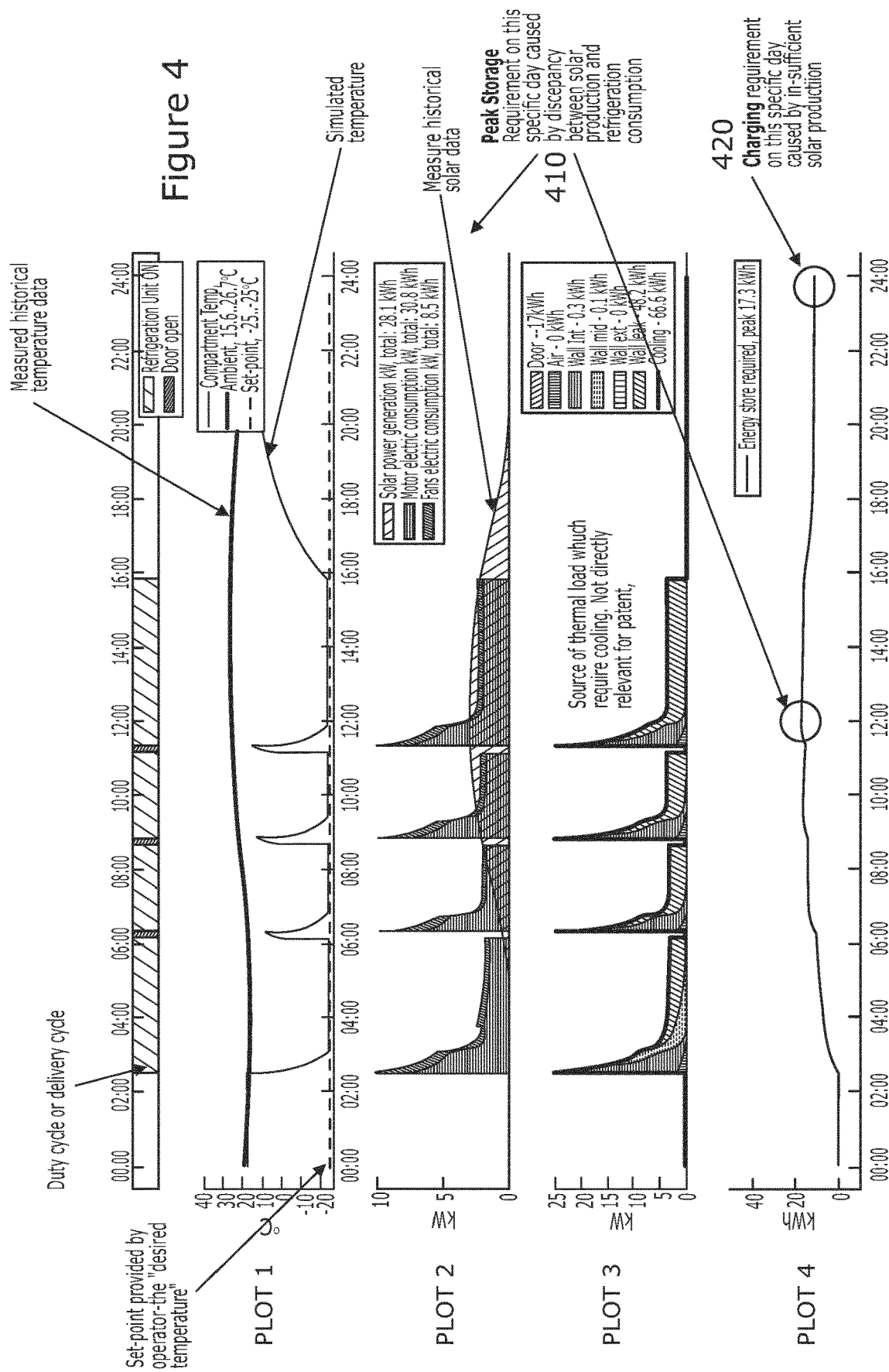
FIG. 4 shows an example of the input and a single iteration of output of the software in graphic form.

A more detailed example of how the model used for the simulation of a delivery iteration (320,322 in FIG. 3) is configured is now given with reference to FIGS. 4 to 18. FIG. 4 shows various examples of input data and output data for a delivery iteration in the model. The first plot shows the duty cycle of the refrigeration unit over the course of a day, showing the times when refrigeration is to start and end (cooling demand), and times when the doors 12a are opened for loading/unloading during the delivery (door open events).

The second plot shows the desired set point temperature provided by the operator, i.e. the desired temperature for the goods in the trailer. The plot also shows the ambient temperature, which varies throughout the delivery cycle, typically peaking during the afternoon as shown here. The plot also shows the temperature of the trailer, starting at the ambient temperature at the start of the delivery cycle before the temperature is pulled down to the set point temperature, and sharply rising each time the doors are opened for a delivery, before being pulled down again. The trailer may be configured as having multiple compartments, in which case, multiple temperatures may be provided by the model.

The third plot shows the power characteristics for the delivery iteration. The first trace shows the power instantaneously obtainable through the solar panels based on the historical weather data, which as shown here is a perfect bell shape, peaking around midday, indicative of the absence of cloud cover in this example. NB solar power continues to be generated after the delivery cycle has finished (and potentially before it starts), e.g. the trailer is parked up but still generating electricity while that is used to charge the batteries. The second trace shows the power required by the refrigeration system (broken down into components for the compressor and the fans). As expected, the power requirement peaks when the temperature peaks (e.g. at initial pull down and after door open events) and the refrigeration system has to work hardest to bring down the temperature.

The fourth plot shows the various sources for the thermal load which require cooling. This might comprise the amount of heat that is transferred into the trailer from the outside through the various walls, doors, etc.

The fifth plot shows the energy storage required to meet the cooling requirements throughout the day. This is based on the accumulated discrepancy between the solar electricity production and refrigeration system electricity consumption. This can be obtained by finding the time integral of the consumption minus the time integral of the production in the third plot. The peak value 410 gives the minimum battery capacity to store sufficient energy to meet peak demand for that delivery iteration, i.e. for the delivery cycle on that particular historical day with a particular configuration of solar panels. The final value 420 gives the charging requirement, i.e. the amount of energy that must be replenished before the next delivery cycle.

As discussed in relation to FIG. 3, this gives rise for each delivery iteration and configuring of solar panels output values 325 for storage and charging, where "storage" is the amount of battery capacity required and is linked to capital expenditure, whilst "charging" is the amount of energy that could not be provided by solar and must be paid for and is therefore linked to operating expenditure. It is of course possible to power the system purely by stored energy in the batteries, pre-charged via the grid before the duty cycle starts, if they are large enough. This minimizes capital expenditure on solar arrays, but may increase capital expenditure on batteries. However, using solar energy is "free" and has the benefit of reducing operating expenses and being potentially "greener". In particular, a larger solar array generates more solar energy and therefore requires less battery charge/charging and allows a smaller battery. However, beyond a certain point, increasing the solar array size and reducing the battery size ceases to work, as the battery becomes too small to store the excess solar energy at which point some proportion of the solar array capacity cannot be utilized. An optimum therefore must be found between these extremes, i.e. by minimizing the cost function as shown in FIGS. 19A and 19B.

Figure 16:
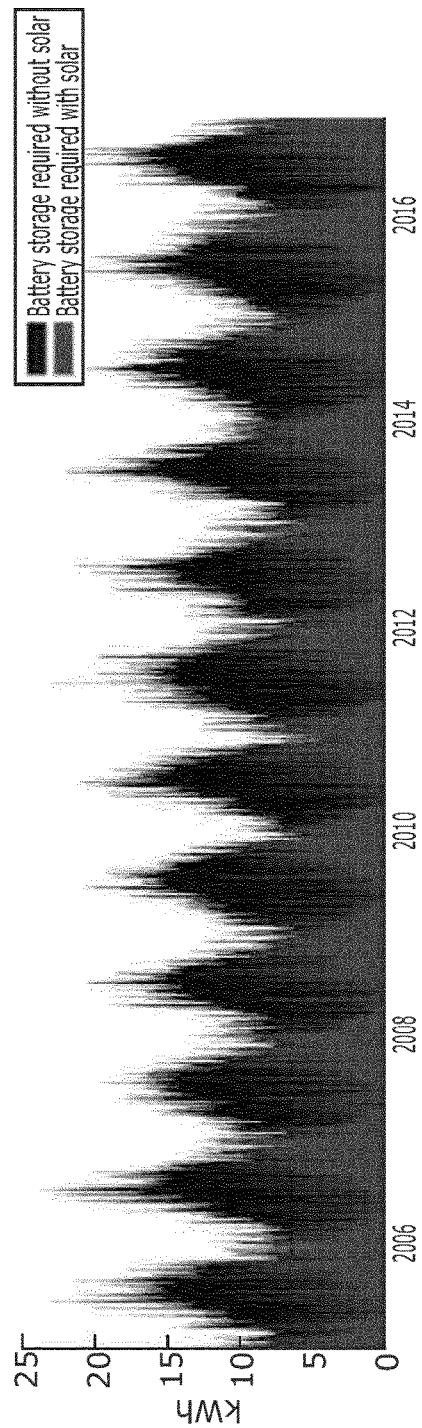
FIG. 16 shows graphically the battery storage required with and without a contribution from solar.

FIG. 16 shows the peak battery storage required for each of the 4383 simulations with and without solar, i.e. the peak discrepancy between energy consumed and generated by solar as per the fifth plot of FIG. 4. As explained above, the simulation may be performed for other numbers of solar panels, giving further plots (only a single configuration of 4 kWp is shown in this drawing for clarity of illustration).

Figure 5:
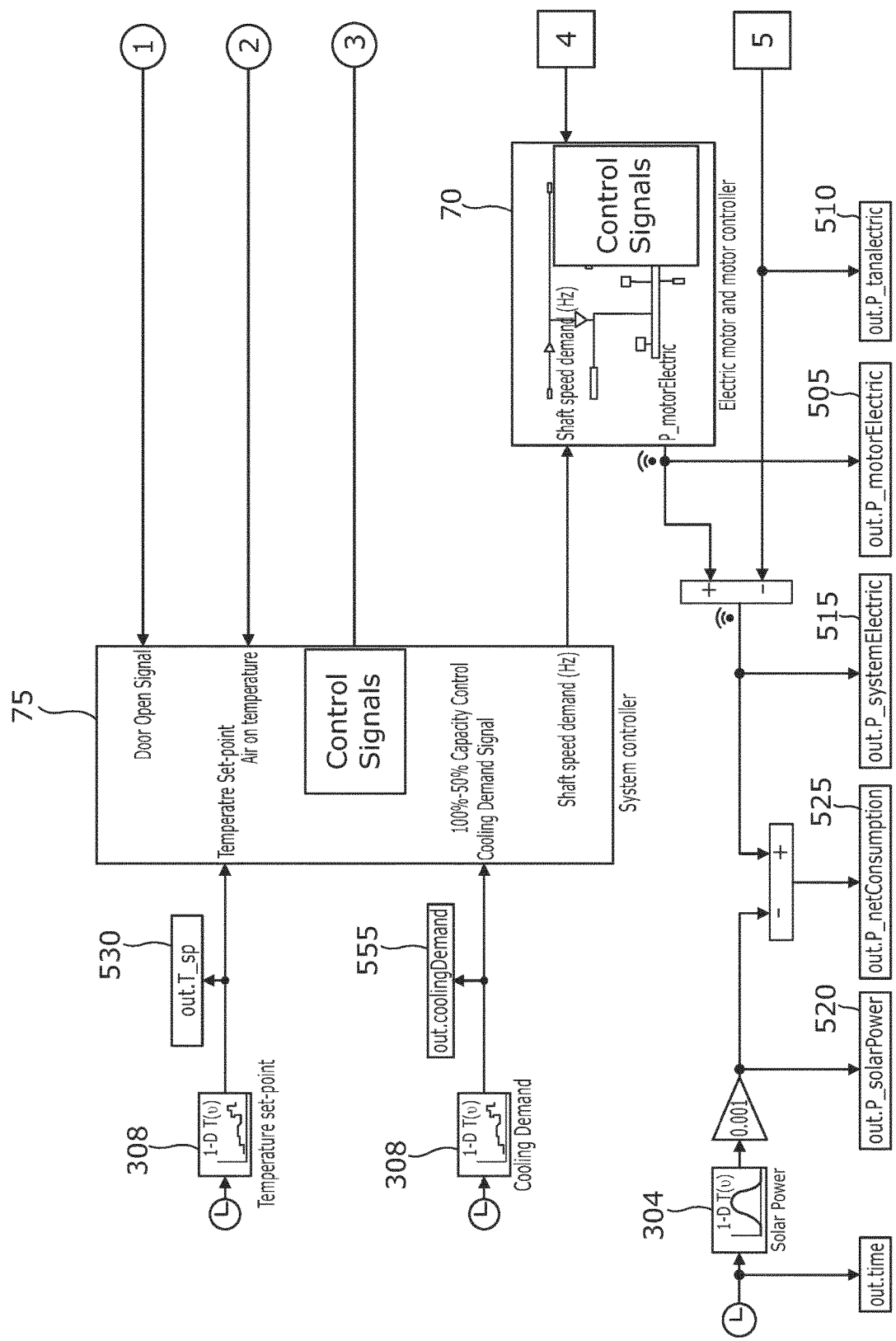
FIG. 5 shows an example of a model used by the software to simulate an iteration of the operation of the refrigeration system and trailer.
Figure 5:
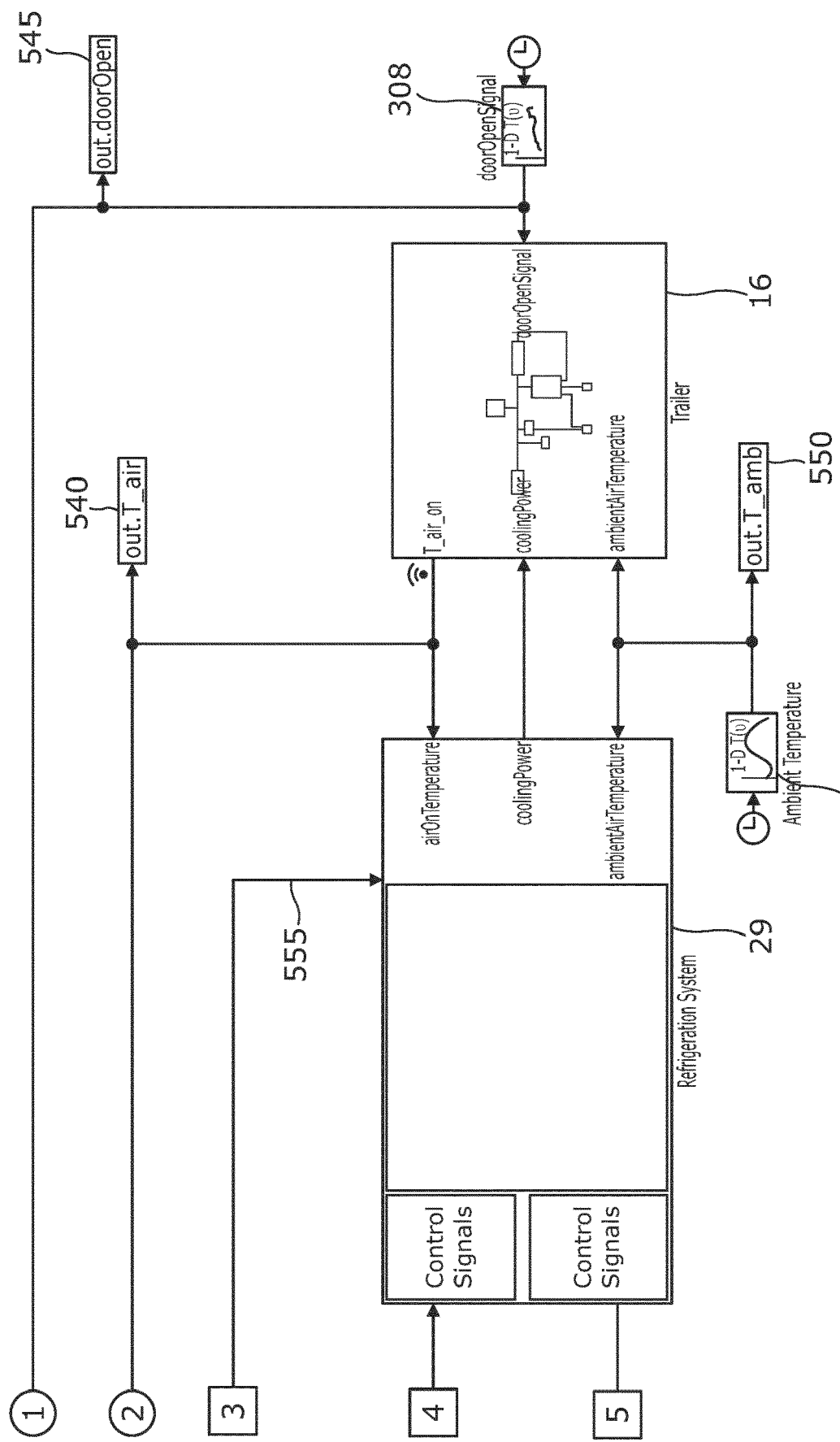

FIG. 5 shows a schematic diagram of how the energy system is modelled. The model in this example is a transient reduced order model resolved for thousands of time-steps every delivery iteration. Well known software packages such as MATLAB/Simulink may be used to operate the model. Variable-step solvers in the underlying software may automatically vary the step size during the delivery iteration, reducing the step size to increase accuracy when model states are changing rapidly and increasing the step size to avoid taking unnecessary steps when model states are changing slowly.

The model includes subsystems including motor controller for the compressor and fans, the refrigeration system, and the trailer, and the system controller. The various inputs and output variables are shown, as well as energy flows. Thus, the compressor motor draws power 505 and the fans draw power 510 which are summed to give the combined consumed power of the system 515. The solar energy production is extracted from historical data based on the time at which the journey starts, the current time and the historic weather data which give rise to the solar energy produced 520. The net power (525 must of course be supplied by the battery storage during the trip. These are all time based signals giving continuous or periodic readings. The determination of the accumulated peak discrepancy occurs in a post-processing algorithm.

Other inputs include the set point temperature 530 which is input to the controller as the target temperature to reach in the trailer based on the initial parameters entered to the model. This is generally a constant value for the duty cycle. The cooling demand 535 signal is a time based signal indicating when the trailer is required to be cooled for the delivery cycle, i.e. at the start time of the journey, and finishes at the end of the journey. The controller also receives time based signals indicative of the modelled temperature within the trailer 540 and door open events 545. The door open events (e.g. times and durations) are input as user generated parameters to the model according to the delivery cycle being modelled. Based on these signals, the operation of the controller is simulated in activating the motor controller to drive the compressor with a particular speed (shaft speed demand signal). For instance, in a simple control scheme, during a cooling demand period, the controller may drive the compressor proportionally to the error between the set point temperature and the actual temperature, or a well-known "PID" type controller may be used, or any other convenient control scheme.

The motor controller is modelled in driving the compressor with an output shaft speed to overcome the torque offered by the compressor based on the control signals it receives.

The ambient air temperature 550 time series is generated from the historic weather data for the relevant time period and affects both the refrigeration system and the trailer system. The refrigeration system is modelled as how much cooling power is delivered to the trailer for a given shaft speed input from the motor controller, the actual temperature and ambient temperature at any given instant.

The model of the refrigeration system may optionally also take into account other controllable elements 555, as controlled by the system controller.

Figure 5A:
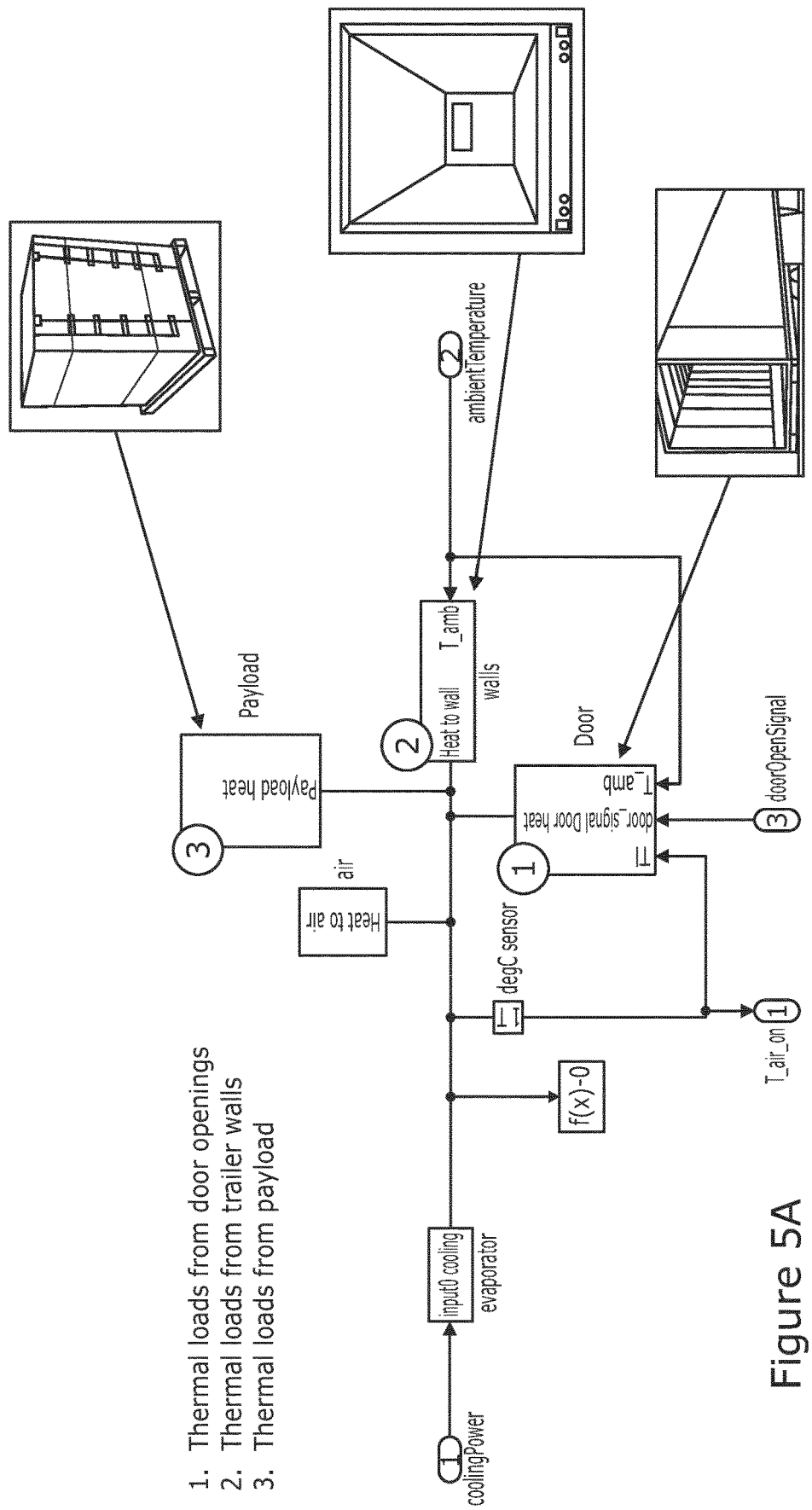
FIG. 5A shows the sub-model for the trailer and door including the payload providing the heat load on the refrigeration system.
Figure 6:
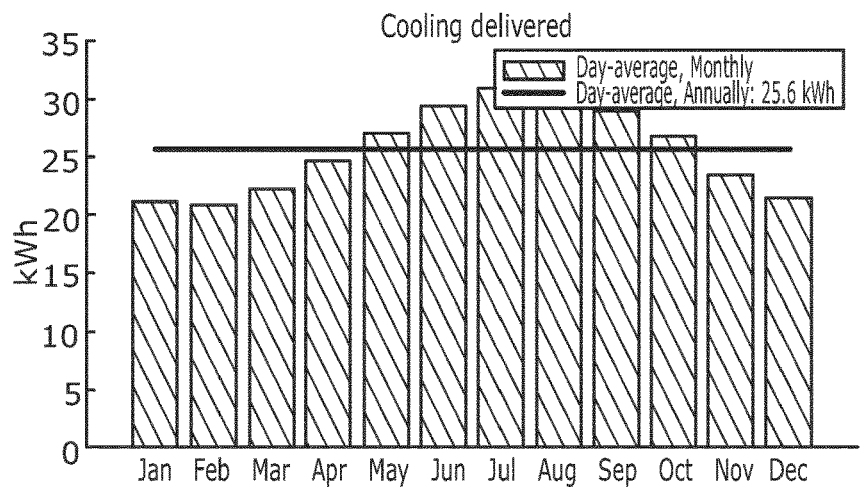
FIGS. 6 to 13 show bar charts illustrating further outputs of the software simulation where the outputs are averaged over each month and plotted.

FIG. 5A shows the sub-model for the trailer. The trailer is modelled as a combination of the thermal loads from the door opening events, the walls of the trailer and the payload, and outputs the actual temperature achieved within the trailer given the cooling power input to the system by the evaporator and ambient temperature, and door open events.

The trailer model may comprise a Resistance-Capacitance (RC) thermal model able to represent the envelope thermal inertia for evaluating heat energy fluxes in the trailer/enclosure. The RC model comprises modules which simulate the thermal response of a various element of the trailer, e.g. a wall, etc. Each module consists of an number of Resistances and Capacitances and is connected to the other modules by thermal nodes and coupled to an air internal temperature node in order to obtain a realistic exemplification of the specific boundary conditions and gains distribution in the conditioned space. The resulting differential balance equations in each node may be solved by the software with known numerical methods. Predetermined serial RC network constants are obtained for the trailer type being simulated, which are derived according to the trailer parameters. The trailer parameters may include model parameters such as the dimensions and volume of the space, the wall constructions, thickness and materials, and details of the doors, allowing the heat fluxes and thermal performance to be modelled. The trailer may contain more than one compartment, e.g. a freezer compartment and a 5 degree C. compartment, which may both be modelled. The RC network constants are converted into Simulink.

The payload is also modelled as a RC network. Each pallet is modelled as plural layers, modelling the gradual temperature equalization within the pallet in response to a temperature gradient (e.g. on pulldown or after a door open event). These are joined together into one simple RC network. Details of the payload, e.g. the number of pallets, their mass and the type of payload may be input to the system, e.g. obtained from the delivery cycle data, and used to derive suitable parameters for the RC model. The model may be updated during the simulation in response to door open events, i.e. some or all part of the payload being unloaded. The RC network is converted into Simulink.

Door open events are modelled as heat escaping from the enclosure over time given the ambient and current internal air temperatures. A set of ordinary differential equations are converted into Simulink for modelling.

The model thus plots the temperature and power time series of the system over each delivery iteration for each historical weather day, shown for instance in FIG. 4. Based on this, various useful output values may be derived for each historical day, including:
  cooling delivered (kWh)
  energy consumption (kWh)
  system Coefficient of Performance, i.e. the efficiency in converting energy consumed by the refrigeration system into cooling delivered
  solar energy generated (assuming battery storage unlimited so always available to store excess solar energy) (kWh)
  solar energy generated (if the battery starts the delivery cycle fully charged) (kWh)
  peak energy storage required (kWh)
  charging required if battery storage is limited
  charging required if battery starts at 100% charge.

Of these, only max peak energy storage and mean charging required 325 are directly used in the optimization step.

NB. The time series directly extracted from the model would be in kW. The accumulated time-series values (time integral) would be in kWh.

Figure 7:
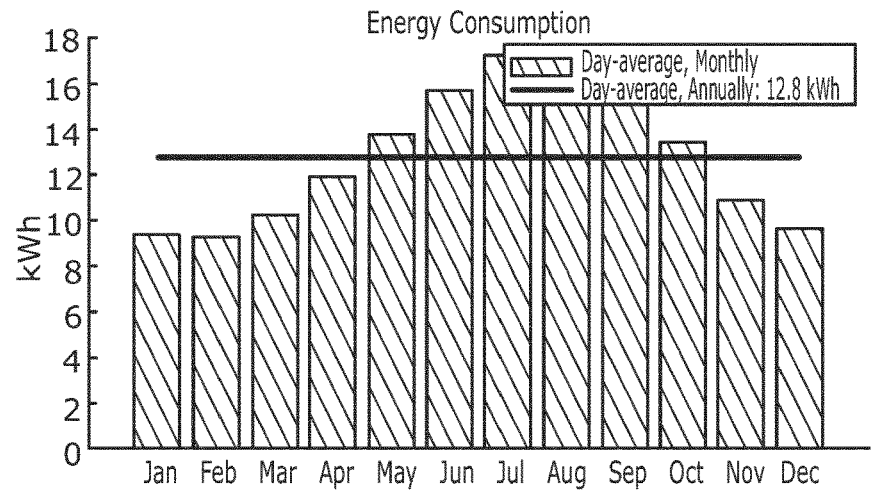
Figure 8:
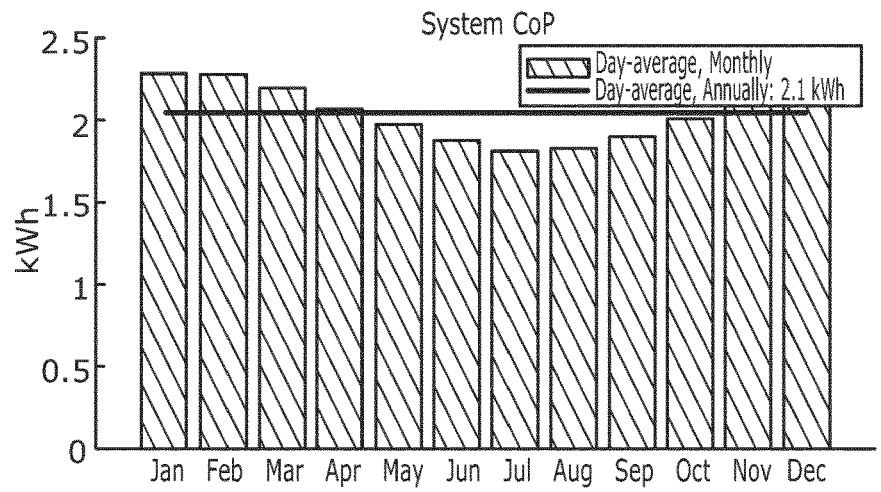

By way of illustration, FIGS. 6 to 13 show further detail of these outputs of the software simulation where the outputs for all simulations (in this example, being a historical day from January 2005 to December 2016) are averaged over each month and plotted as bar charts. They illustrate trends in the data, but do not provide any details on worst-case/best-case days, which ultimately are those used to determine possible battery capacities. It can be seen for instance from FIG. 6 that the cooling required is higher in summer months (as per selected northern hemisphere location) and accordingly the energy consumption by the refrigeration system is also higher, as shown by FIG. 7. The system coefficient of performance falls in the summer, as shown by FIG. 8, as the refrigeration system is less efficient in converting input energy to cooling delivered, as the refrigeration system must work harder to the heat out to a higher ambient temperature.

Figure 10:
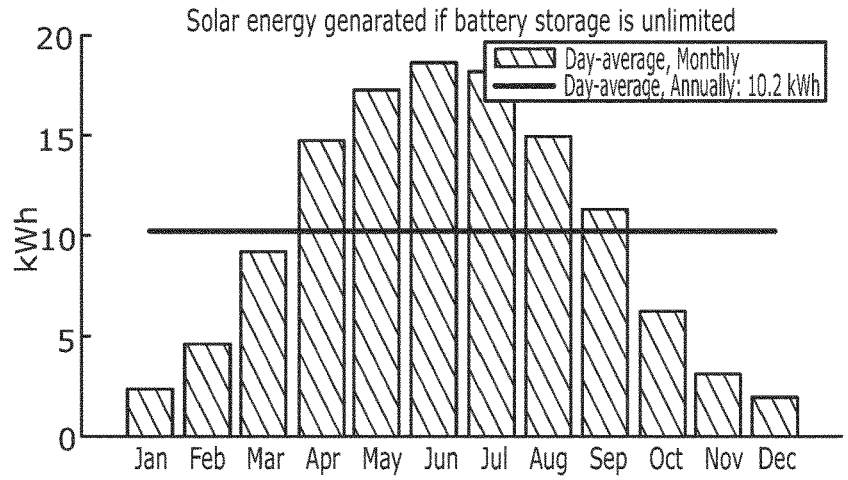
Figure 11:
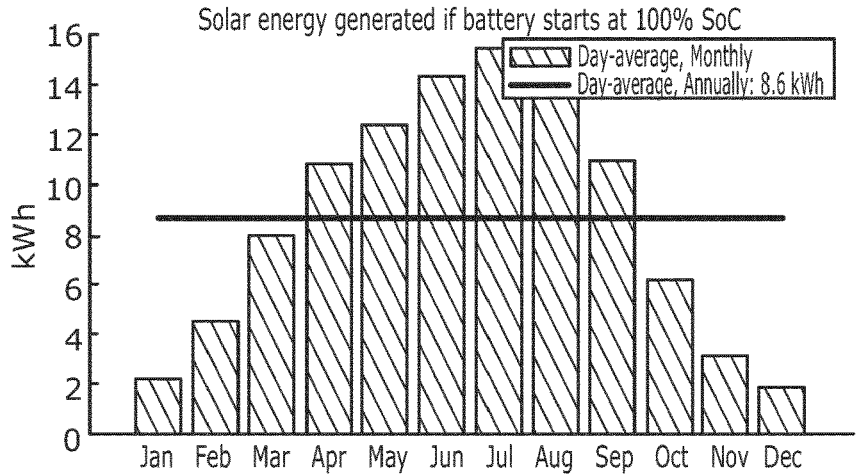

The solar energy generated is also higher in the summer months, where longer days and higher incident solar radiation is expected. FIG. 10 shows the maximum power the solar panels can generate based on the incident solar radiation. This might for instance be derived directly from the historic weather database. However if more power is instantaneously generated that is required by the refrigeration system, and batteries are at that time fully charged, then any excess solar energy cannot be utilized in the system and is effectively wasted. FIG. 11 shows the "useful" solar energy that can be employed by the system based on the assumption that the batteries start the delivery cycle fully charged.

Figure 9:
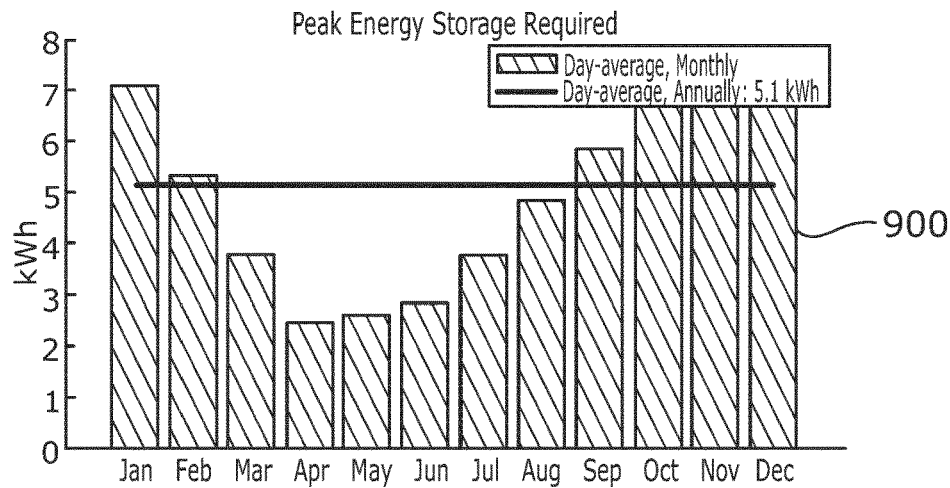
Figure 12:
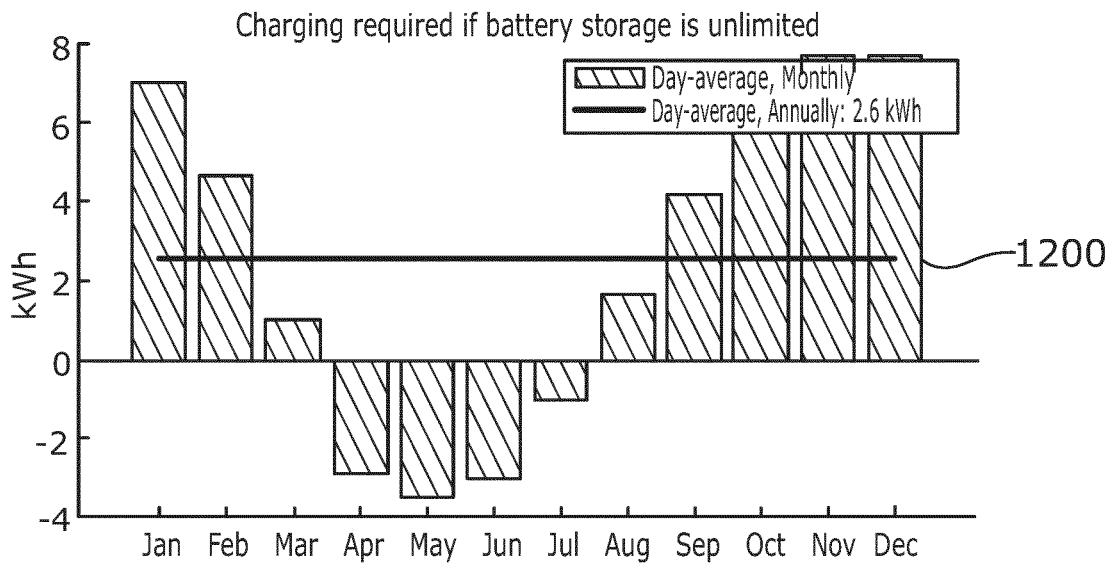
Figure 13:
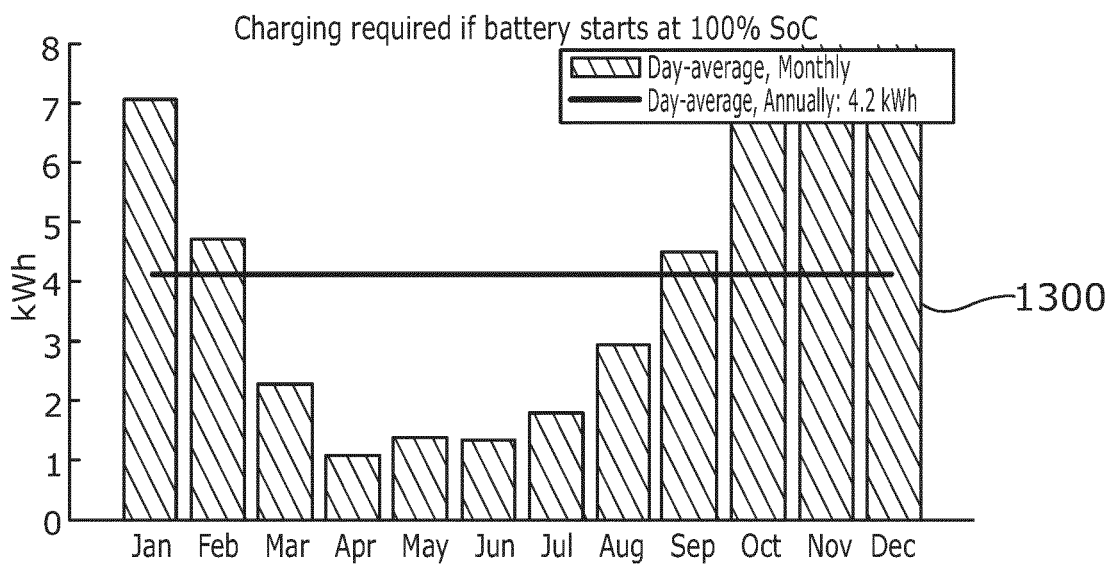

The difference between the energy consumed and the solar energy produced must be supplied by the batteries. FIG. 9 shows the peak energy storage required. FIG. 12 shows the net charging required where no solar is wasted. It can be seen that in the summer months, excess solar is generated. As shown by FIG. 13, where the more realistic assumption as to battery initial charge is used, more battery charging is required as some solar energy is wasted. This is most in evidence in early summer months, when plenty of solar radiation can be expected, but ambient temperatures are not as high as in late summer. The mean net charging required per day 1200,1300 is shown in FIGS. 12 and 13.

Figure 14:
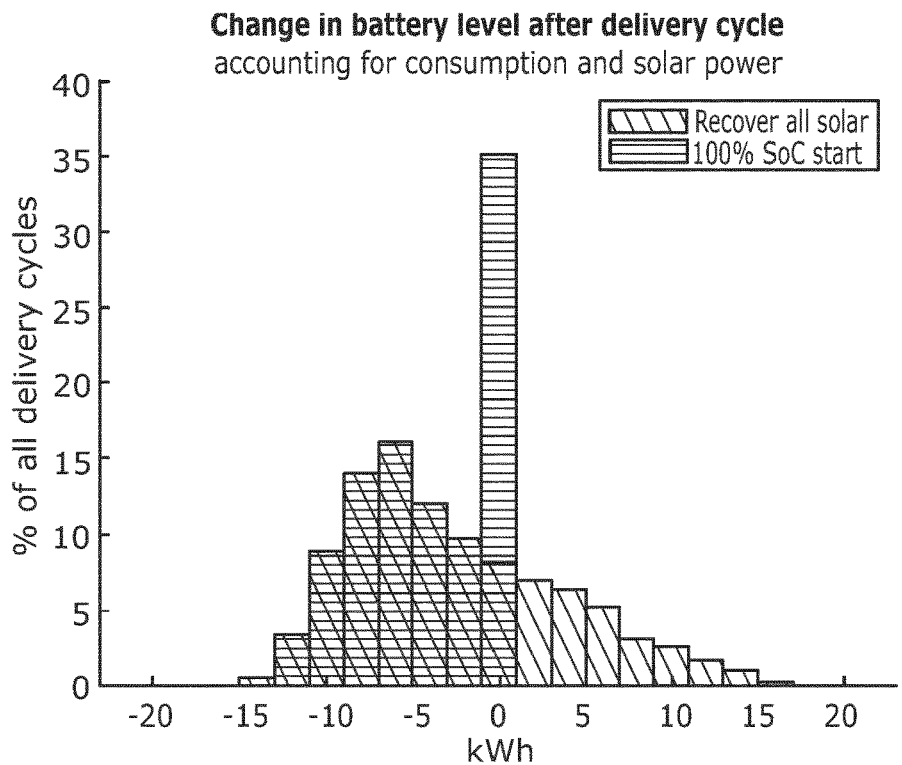
FIG. 14 shows a histogram plotting the distribution of change in battery charge level after all delivery iterations accounting for consumption and solar power generation.

FIG. 14 shows a histogram plotting the change in battery charge level after all delivery iterations sorted into bins accounting for consumption and solar power generation for a given solar array size, i.e. the amount of grid energy that must be used to charge the batteries or the amount of excess battery storage that could be exported to the grid. It can be seen that where all the generated solar energy is used, i.e. the finite battery capacity never becomes limiting, some delivery cycles result in excess energy that can be sold back to the grid (positive values on the x-axis), whereas some require an input of energy from the grid to recharge the batteries to the starting level (negative on the x-axis). In contrast, where the battery level is assumed to be finite and starting fully charged, the units cannot finish a delivery cycle with more charge than they started, and can at best break even, represented by the particular peak at 0 kWh net energy on the x-axis. As discussed above, various assumptions about the level at which the battery is charged at the beginning of the delivery cycle, e.g. charging to 100% SoC, a reduced level SoC, or using smart charging, can be made by module 324 of the model. The graphs shown are for a 4 kWp array specifically which is not necessarily the optimum.

Figure 15:
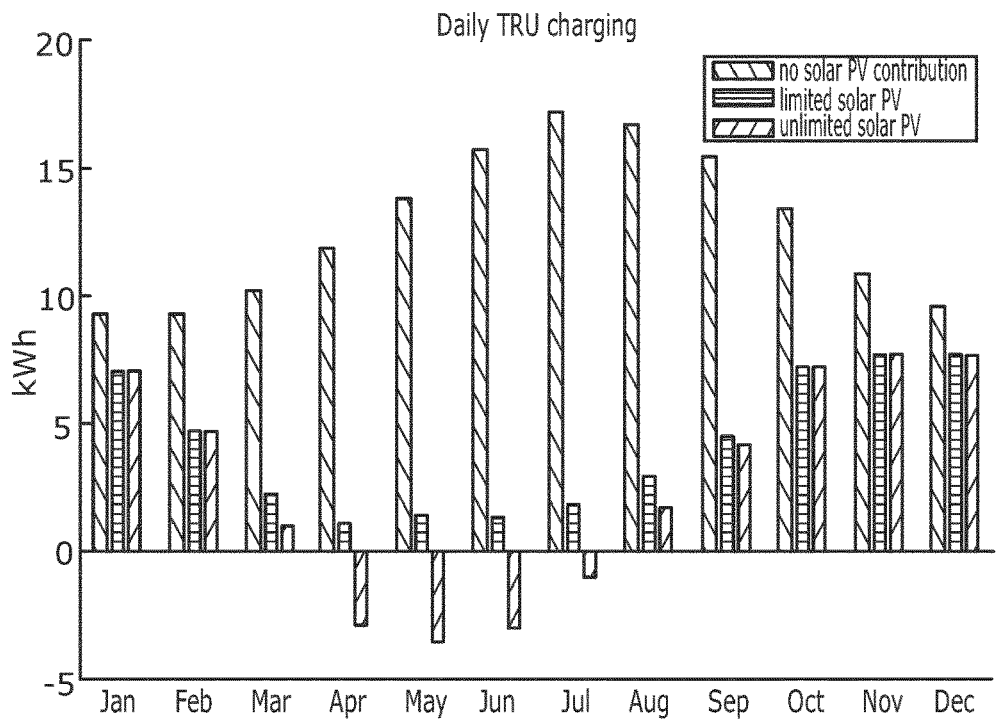
FIG. 15 shows a bar chart of the daily charging required for each month based on various assumptions.

FIG. 15 shows a bar chart plotting the daily charging required for each month based on three assumptions of no solar generated (i.e. no solar panels installed), limited solar generated (where the battery size is assumed finite and starting at 100% SoC) and unlimited solar generated (the batteries can store all excess solar).

Figure 17:
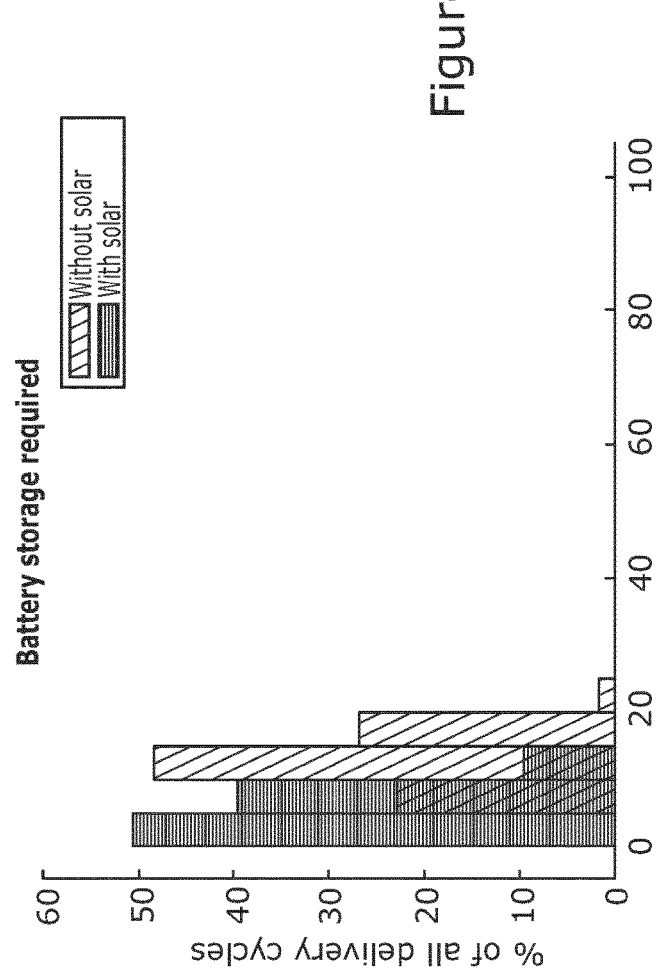
FIGS. 17 and 18 show histograms of the peak battery storage required with and without solar.
Figure 18:
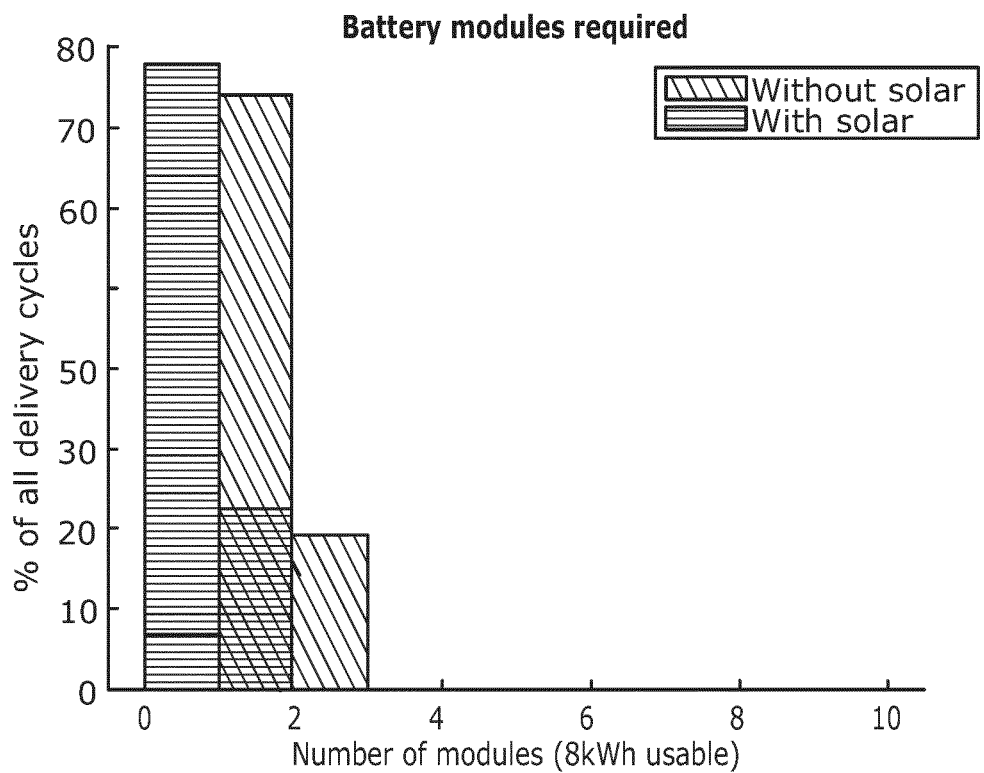

FIG. 17 shows a histogram plotting the peak battery storage required with and without solar, wherein the battery capacity is "binned" in 5 kWh bins on the x-axis and the percentage of delivery cycles falling within each "bin" is plotted on the y-axis. FIG. 18 shows a histogram plotting the bin size adjusted to the size of battery packs that are available to be installable into the system and plotted as number of battery modules to give the required capacity. Thus, as can be seen, with solar panel generation, approx. 80% of journeys can be accomplished with 1 battery module, and approx. 20% can be accomplished with 2 battery modules. Whereas, without solar generation, approx. 8% of trips can be accomplished with 1 battery module, approx. 75% can be accomplished with 2 battery modules and approx. 17% can be accomplished with 3 battery modules.

Thus, for each configuration of solar panels, the minimum number of batteries required to supply the energy to the system can be found by simply taking the highest value from the x-axis 170a, 170b, which can therefore be expected to deal with peak demand with statistical confidence. Optionally, some degree of contingency and/or tolerance may be built in at this stage. For instance, a contingency of between 10% and 20% may be used to take into account inaccuracies in the modelling. The model may be extended to simulate other means of energy import/export, i.e. (1) exporting to tractor unit to save fuel (2) exporting to grid to sell excess electricity and (3) importing from tractor in extreme cases (to minimize battery contingency or size altogether) and the cost function extended to include these variables.

There is accordingly some choice in provisioning the system in that (in this example) there are two different combinations of battery numbers and solar panels that can be expected to meet peak energy capacity demand. These output values of solar configuration vs battery capacity are then fed into the optimization algorithm to determine the optimum configuration according to a predefined metric, as previously discussed. Thus, as per Table 1, the capital expenditure of each option and the operating costs of each option are input to a cost function which is minimized to determine the best combination for the particular duty cycle. Typically this would the Total Cost of Ownership (TCO), as shown by FIGS. 19A and 19B.

Once the optimum configuration is identified and deployed, the cloud based software system will manage the monitoring and charging of the batteries on a day-to-day basis according to the prevailing weather conditions on that day. However, assuming no exceptional weather conditions arise that are not present in the historical weather database, the number of batteries and solar panels should always be able to cope with the energy supply demand of the duty cycle.

In the examples described above, the number of solar panels is varied across multiple simulations of the model to provide the optimum number of batteries and solar panels according to a cost metric. However additionally or alternatively other system parameters, such as the trailer wall thickness or insulation type, that have an effect on the thermal performance, may be varied across multiple simulations of the model. The cost function is adapted to include the new parameter, e.g. the cost or environmental impact of additional insulation, such that minimizing the cost function indicates the optimized combination of battery size and the additional system parameter.

Embodiments of the present disclosure have been described with particular reference to the examples illustrated. However, it will be appreciated that variations and modifications may be made to the examples described within the scope of the present claims.

The invention claimed is:

1. A computerized method for determining battery capacity of one or more rechargeable batteries for an electric refrigeration unit, the electrical refrigeration unit being of a type configured to draw power from the rechargeable batteries in cooling an interior of a mobile enclosure, the method comprising:
receiving input data relating to a location in which the refrigeration unit is to be deployed;
retrieving historical weather data from a database for that location including at least ambient air temperature;
receiving input data indicating a desired delivery cycle for the refrigeration unit, including at least information about times of delivery, and a desired set point temperature to be attained in the enclosure during the delivery;
receiving input data identifying thermal properties of the enclosure;
simulating in a model thermal performance of the enclosure and refrigeration unit based on the thermal properties wherein the model outputs energy requirements for cooling the enclosure to the set point temperature of the delivery cycle for a particular historical day using the historical weather data for that day and the times of delivery;
iteratively simulating the energy requirements for delivery cycles on plural historical days;
determining an amount of energy that must be supplied from the batteries to meet the energy requirements; and
determining a battery capacity for storing sufficient energy to meet the energy requirements for each delivery cycles.

2. The method of claim 1, wherein the electrical refrigeration unit also draws power from one or more solar panels, and the method further comprises calculating in each iteration of the simulation the amount of solar energy generated by the panels based on available solar radiation in the retrieved historical weather data,
wherein determining the amount of energy that must be supplied from the batteries comprises deducting the amount of available solar from the energy requirements for cooling the enclosure.

3. The method of claim 2, further comprising:
for each iteration, running the simulation for plural different configurations of the solar panels, the configurations comprising different numbers and/or generating capacities of the panels, wherein determining the battery capacity is determined for each configuration of solar panels; and
determining an optimum battery capacity and configuration of solar panels by minimizing a cost function.

4. The method of claim 3, wherein a maximum value of a peak amount of energy that must be supplied from the batteries during a delivery iteration across all historical weather days is used to determine the battery capacity, and a mean amount of energy that is depleted from the batteries at an end of a delivery iteration across all historical weather days is used to determine the mean amount of charging of the batteries from a grid, wherein one or any combination of the battery capacity, solar panel configuration and amount of charging are used as variables in the cost function.

5. The method of claim 4, wherein the modelling simulates excess energy from the solar panels that is not required at a particular time to power the refrigeration unit being used to charge the batteries.

6. The method of claim 5, wherein the modelling assumes a finite size of batteries and a predetermined initial state of charge at a start of the delivery cycle, determines a running level of charge in the batteries and further determines where excess solar energy cannot be used to charge the batteries when at 100% State of Charge.

7. The method of claim 5, wherein the modelling simulates excess solar energy being exported to a tractor unit arranged to transport the refrigeration unit, and the cost function includes a variable for fuel savings in the tractor unit as a result.

8. The method of claim 7, wherein modelling simulates a deficit in battery charge level being provided by energy imported from the tractor unit.

9. The method of claim 5, wherein the modelling simulates a net charge that must be imported and/or exported to the batteries from a grid before the delivery cycle in order to meet the energy requirements for each of the historical weather days, and wherein the cost function includes a variable relating to the amount of charge.

10. The method of claim 9, wherein the cost function includes capital expenditure of the batteries and solar panels and operating cost of charging the batteries from the grid and optionally maintenance costs of the refrigeration unit.

11. The method of claim 1, comprising:
for each iteration, running the simulation for plural different configurations of at least one property of the enclosure and refrigeration system that affects thermal performance and/or efficiency,
wherein determining the battery capacity is determined for each configuration of that property; and
determining an optimum battery capacity and configuration for that property by minimizing a cost function.

12. The method of claim 1, wherein the simulation is for historical days spanning at least a year, and preferably plural years.

13. The method of claim 1, wherein one or more of:
the model takes historic weather data at plural points in time during the delivery cycle,
the enclosure properties include one or more of wall thickness, wall materials, and enclosure dimensions to model the thermal performance of the enclosure, and
the input data for the delivery cycle includes timings of door open events and/or payload type or types.

14. The method of claim 1, wherein the modelling comprises a model of the enclosure including thermal properties including one or more of: wall thicknesses and/or materials; number of compartments in the enclosure each of which may be allocated a different desired set point temperature; payload type or types; and door opening events.

15. The method of claim 1, wherein the modelling comprises a Resistance Capacitance (RC) thermal model of the enclosure to determine heat flows into the enclosure for a given temperature gradient between air temperature in the enclosure and ambient air temperature and an effect on the air temperature in the enclosure and/or for modelling door open events and the thermal properties include constants for the RC thermal model.

16. The method of claim 15, wherein the modelling includes modelling a response of a system controller in activating the refrigeration unit to supply cooling where the actual temperature deviates from the desired set point temperature.

17. The method of claim 16, wherein modelling includes modelling the energy requirements in providing that response.

18. The method of claim 1, wherein the simulation is a transient reduced order model resolved for multiple time-steps every iteration of the simulation.

19. A computerized method for determining solar panel capacity for an electric refrigeration unit, the electrical refrigeration unit drawing power from the solar panels and from rechargeable batteries in cooling an interior of a mobile enclosure, the method comprising:
receiving input data relating to a location in which the refrigeration unit is to be deployed;
retrieving historical weather data from a database for that location including at least incident solar radiation;
receiving input data indicating a desired delivery cycle for the refrigeration unit, including at least information on times of delivery, and a desired set point temperature to be attained in the enclosure during the delivery;
receiving input data identifying thermal properties of the enclosure;
simulating in a model thermal performance of the enclosure and refrigeration unit based on the thermal properties wherein the model outputs energy requirements for cooling the enclosure to the set point temperature the delivery cycle for a particular historical weather day using the historical weather data for that day and the times of delivery;
iteratively simulating the energy requirements for delivery cycles on plural historical days;
determining an amount of energy that must be supplied from batteries and solar panels to meet the energy requirements;
determining a solar panel capacity for generating sufficient energy to meet the energy requirements for each of the plural historical days for batteries having a particular capacity.

20. A method of provisioning an electric refrigeration unit, comprising one or more of:
i) determining with a computer battery capacity of one or more rechargeable batteries for an electric refrigeration unit to power cooling an interior of a mobile enclosure by:
receiving input data relating to a location in which the refrigeration unit is to be deployed;
retrieving historical weather data from a database for that location including at least ambient air temperature;
receiving input data indicating a desired delivery cycle for the refrigeration unit, including at least information about times of delivery, and a desired set point temperature to be attained in the enclosure during the delivery;
receiving input data identifying thermal properties of the enclosure;
simulating in a model thermal performance of the enclosure and refrigeration unit based on the thermal properties wherein the model outputs energy requirements for cooling the enclosure to the set point temperature of the delivery cycle for a particular historical day using the historical weather data for that day and the times of delivery;
iteratively simulating the energy requirements for delivery cycles on plural historical days;
determining an amount of energy that must be supplied from the batteries to meet the energy requirements;
determining a battery capacity for storing sufficient energy to meet the energy requirements for each delivery cycles; and
provisioning the refrigeration unit in accordance with the determined battery capacity;
and
ii) determining with a computer solar panel capacity for an electric refrigeration unit, the electrical refrigeration unit drawing power from the solar panels and one or more rechargeable batteries in cooling the interior of a mobile enclosure, by:
receiving input data relating to the location in which the refrigeration unit is to be deployed;
retrieving historical weather data from a database for that location including at least incident solar radiation;
receiving input data indicating a desired delivery cycle for the refrigeration unit, including at least information on the times of delivery, and a desired set point temperature to be attained in the enclosure during the delivery;

receiving input data identifying thermal properties of the enclosure;

simulating in a model the thermal performance of the enclosure and refrigeration unit based on the thermal properties wherein the model outputs the energy requirements for cooling the enclosure to the set point temperature the delivery cycle for a particular historical weather day using the historical weather data for that day and the times of delivery;

iteratively simulating the energy requirements for delivery cycles on plural historical days;

determining an amount of energy that must be supplied from batteries and solar panels to meet the energy requirements;

determining a solar panel capacity for generating sufficient energy to meet the energy requirements for each of the plural historical days for batteries having a particular capacity;

and provisioning the refrigeration unit in accordance with the determined solar panel capacity.

* * * * *